(12) United States Patent
Cai et al.

(10) Patent No.: US 12,001,428 B2
(45) Date of Patent: Jun. 4, 2024

(54) BUILD-SIDE SKEW HANDLING FOR HASH-PARTITIONING HASH JOINS

(71) Applicant: Snowflake Inc., Bozeman, MT (US)

(72) Inventors: Xinzhu Cai, San Mateo, CA (US); Florian Andreas Funke, San Francisco, CA (US)

(73) Assignee: Snowflake Inc., Bozeman, MT (US)

(*) Notice: Subject to any disclaimer, the term of this patent is extended or adjusted under 35 U.S.C. 154(b) by 8 days.

(21) Appl. No.: 18/047,872

(22) Filed: Oct. 19, 2022

(65) Prior Publication Data
US 2024/0134851 A1 Apr. 25, 2024

(51) Int. Cl.
*G06F 16/24* (2019.01)
*G06F 16/22* (2019.01)
*G06F 16/2453* (2019.01)

(52) U.S. Cl.
CPC .... *G06F 16/24537* (2019.01); *G06F 16/2255* (2019.01)

(58) Field of Classification Search
CPC .................................................. G06F 16/24537
USPC ........................................................... 707/781
See application file for complete search history.

(56) References Cited

U.S. PATENT DOCUMENTS

| | | | |
|---|---|---|---|
| 2014/0214794 A1* | 7/2014 | Attaluri | G06F 16/278 707/714 |
| 2019/0377813 A1* | 12/2019 | Funke | G06F 16/2456 |

* cited by examiner

*Primary Examiner* — Syling Yen
(74) *Attorney, Agent, or Firm* — Schwegman Lundberg & Woessner, P.A.

(57) ABSTRACT

Provided herein are systems and methods for handling build-side skew. For example, a method includes computing a plurality of hash values for a join operation. The join operation uses a corresponding plurality of row sets. The plurality of hash values are sampled to detect a frequent hash value. A build-side row set is partitioned using the frequent hash value to generate a partitioned build-side row set. The build-side row set is selected from the plurality of row sets. The partitioned build-side row set is distributed to a plurality of hash-join-build (HJB) instances executing at a corresponding plurality of servers.

30 Claims, 19 Drawing Sheets

BUILD-SIDE TABLE 402

| bKey 404 | bVal 406 |
|---|---|
| 42 | X |
| 11 | Y |
| 7 | Q |
| 512 | W |
| 123 | Z |

PROBE-SIDE TABLE 410

| pKey 412 | pVal 414 |
|---|---|
| 11 | e |
| 2 | a |
| 11 | o |
| 7 | i |
| 11 | u |
| 11 | b |
| 42 | d |
| 11 | h |
| 123 | g |
| 2003 | f |

RESULT TABLE 420 WHERE bKey=pKey

| bKey 404 | bVal 406 | pKey 412 | pVal 414 |
|---|---|---|---|
| 42 | X | 42 | d |
| 11 | Y | 11 | e |
| 11 | Y | 11 | o |
| 11 | Y | 11 | u |
| 11 | Y | 11 | b |
| 11 | Y | 11 | h |
| 7 | Q | 7 | i |
| 123 | Z | 123 | g |

BEFORE BROADCAST
500

SERVER ONE 501

BUILD TABLE B.1 502

| bKey 504 | bVal 506 |
|---|---|
| 42 | X |
| 11 | Y |

PROBE TABLE P.1 510

| pKey 512 | pVal 514 |
|---|---|
| 11 | e |
| 2 | a |
| 11 | o |
| 7 | i |
| 11 | u |

SERVER TWO 521

BUILD TABLE B.2 520

| bKey 522 | bVal 524 |
|---|---|
| 7 | Q |
| 512 | W |
| 123 | Z |

PROBE TABLE P.2 530

| pKey 532 | pVal 534 |
|---|---|
| 11 | b |
| 42 | d |
| 11 | h |
| 123 | g |
| 2003 | f |

*FIG. 5*

AFTER BROADCAST OF THE BUILD SIDE
600

SERVER ONE 501

BROADCASTED BUILD TABLE 602

| bKey | bVal |
|------|------|
| 42   | X    |
| 11   | Y    |
| 7    | Q    |
| 512  | W    |
| 123  | Z    |

PROBE TABLE P.1 510

| pKey | pVal |
|------|------|
| 11   | e    |
| 2    | a    |
| 11   | o    |
| 7    | i    |
| 11   | u    |

SERVER TWO 521

BROADCASTED BUILD TABLE 602

| bKey | bVal |
|------|------|
| 7    | Q    |
| 512  | W    |
| 123  | Z    |
| 42   | X    |
| 11   | Y    |

PROBE TABLE P.2 530

| pKey | pVal |
|------|------|
| 11   | b    |
| 42   | d    |
| 11   | h    |
| 123  | g    |
| 2003 | f    |

BUILD-SIDE ROWS ARE BROADCASTED TO EACH SERVER

*FIG. 6*

AFTER PROBING THE PROBE SIDE
700

SERVER ONE
501

RESULT R.1 ( bKey=pKey )
702

| bKey | bVal | pKey | pVal |
|------|------|------|------|
| 11 | Y | 11 | e |
| 11 | Y | 11 | o |
| 7 | Q | 7 | i |
| 11 | Y | 11 | u |

SERVER TWO
521

RESULT R.1 ( bKey=pKey )
720

| bKey | bVal | pKey | pVal |
|------|------|------|------|
| 11 | Y | 11 | b |
| 42 | X | 42 | d |
| 11 | Y | 11 | h |
| 123 | Z | 123 | g |

FIG. 7

| FINAL RESULT OF BROADCAST JOIN OPERATION bKey=pKey | | | |
|---|---|---|---|
| bKey | bVal | pKey | pVal |
| 11 | Y | 11 | b |
| 42 | X | 42 | d |
| 11 | Y | 11 | h |
| 123 | Z | 123 | g |
| 11 | Y | 11 | e |
| 11 | Y | 11 | o |
| 7 | Q | 7 | i |
| 11 | Y | 11 | u |

BEFORE HASH PARTITIONING 900

SERVER ONE 901

BUILD TABLE B. 1 902

| bKey 904 | bVal 906 |
|---|---|
| 42 | X |
| 11 | Y |

PROBE TABLE P.1 910

| pKey 912 | pVal 914 |
|---|---|
| 11 | e |
| 2 | a |
| 11 | o |
| 7 | i |
| 11 | u |

SERVER TWO 921

BUILD TABLE B. 2 920

| bKey 922 | bVal 924 |
|---|---|
| 7 | Q |
| 512 | W |
| 123 | Z |

PROBE TABLE P.2 930

| pKey 932 | pVal 934 |
|---|---|
| 11 | b |
| 42 | d |
| 11 | h |
| 123 | g |
| 2003 | f |

*FIG. 9*

AFTER HASH PARTITIONING OF BUILD SIDE
1000

SERVER ONE 901

PARTITIONED BUILD TABLE B. 1
1002

| bKey | bVal |
|---|---|
| 42 | X |
| 512 | W |

BUILD-SIDE ROWS HAVING AN EVEN-NUMBERED JOIN KEY ARE PARTITIONED TO SERVER ONE.

PROBE TABLE P.1
910

| pKey | pVal |
|---|---|
| 11 | e |
| 2 | a |
| 11 | o |
| 7 | i |
| 11 | u |

SERVER TWO 921

PARTITIONED BUILD TABLE B. 2
1020

| bKey | bVal |
|---|---|
| 7 | Q |
| 123 | Z |
| 11 | Y |

BUILD-SIDE ROWS HAVING AN ODD-NUMBERED JOIN KEY ARE PARTITIONED TO SERVER TWO.

PROBE TABLE P.2
930

| pKey | pVal |
|---|---|
| 11 | b |
| 42 | d |
| 11 | h |
| 123 | g |
| 2003 | f |

*FIG. 10*

AFTER PROBING

SERVER ONE
901

RESULT R.1
1202

| bKey | bVal | pKey | pVal |
|------|------|------|------|
| 42   | X    | 42   | d    |

1200

SERVER TWO
921

RESULT R.2
1204

| bKey | bVal | pKey | pVal |
|------|------|------|------|
| 11   | Y    | 11   | b    |
| 11   | Y    | 11   | h    |
| 11   | Y    | 11   | e    |
| 11   | Y    | 11   | o    |
| 11   | Y    | 11   | u    |
| 123  | Z    | 123  | g    |

BUILD-SIDE SKEW HANDLING FOR HASH-PARTITIONING HASH JOINS

TECHNICAL FIELD

Embodiments of the disclosure relate generally to database query processing and, more specifically, to techniques for build-side skew handling for hash-partitioning hash join operations.

BACKGROUND

Databases are widely used for data storage and access in computing applications. A goal of database storage is to provide enormous sums of information in an organized manner so that it can be accessed, managed, updated, and shared. Data may be organized into rows, columns, and tables in a database. Different database storage systems may be used for storing different types of content, such as bibliographic, full text, numeric, and/or image content. Further, in computing, different database systems may be classified according to the organizational approach of the database. There are many different types of databases, including relational, distributed, cloud, object-oriented, and others.

Databases may include one or more tables that include or reference data that can be joined, read, modified, or deleted using queries. Databases can store small or extremely large sets of data within one or more tables. This data can be accessed by various users in an organization or even be used to service public users, such as via a web site or an application program interface (API). Both computing and storage resources and their underlying architecture can play a significant role in achieving desirable database performance. Querying very large databases and/or tables might require scanning large amounts of data. Reducing the amount of data scanned is one of the main challenges of data organization and processing.

BRIEF DESCRIPTION OF THE DRAWINGS

The present disclosure will be understood more fully from the detailed description given below and from the accompanying drawings of various embodiments of the disclosure.

FIG. 4 is a schematic diagram illustrating an example join operation, in accordance with some embodiments of the present disclosure.

FIG. 5 is a schematic diagram illustrating an example join operation, in accordance with some embodiments of the present disclosure.

FIG. 6 is a schematic diagram illustrating an example join operation, in accordance with some embodiments of the present disclosure.

FIG. 7 is a schematic diagram illustrating an example join operation, in accordance with some embodiments of the present disclosure.

FIG. 8 is a schematic diagram illustrating an example join operation, in accordance with some embodiments of the present disclosure.

FIG. 9 is a schematic diagram illustrating an example join operation, in accordance with some embodiments of the present disclosure.

FIG. 10 is a schematic diagram illustrating an example join operation, in accordance with some embodiments of the present disclosure.

FIG. 12 is a schematic diagram illustrating an example join operation, in accordance with some embodiments of the present disclosure.

DETAILED DESCRIPTION

Figure 1:
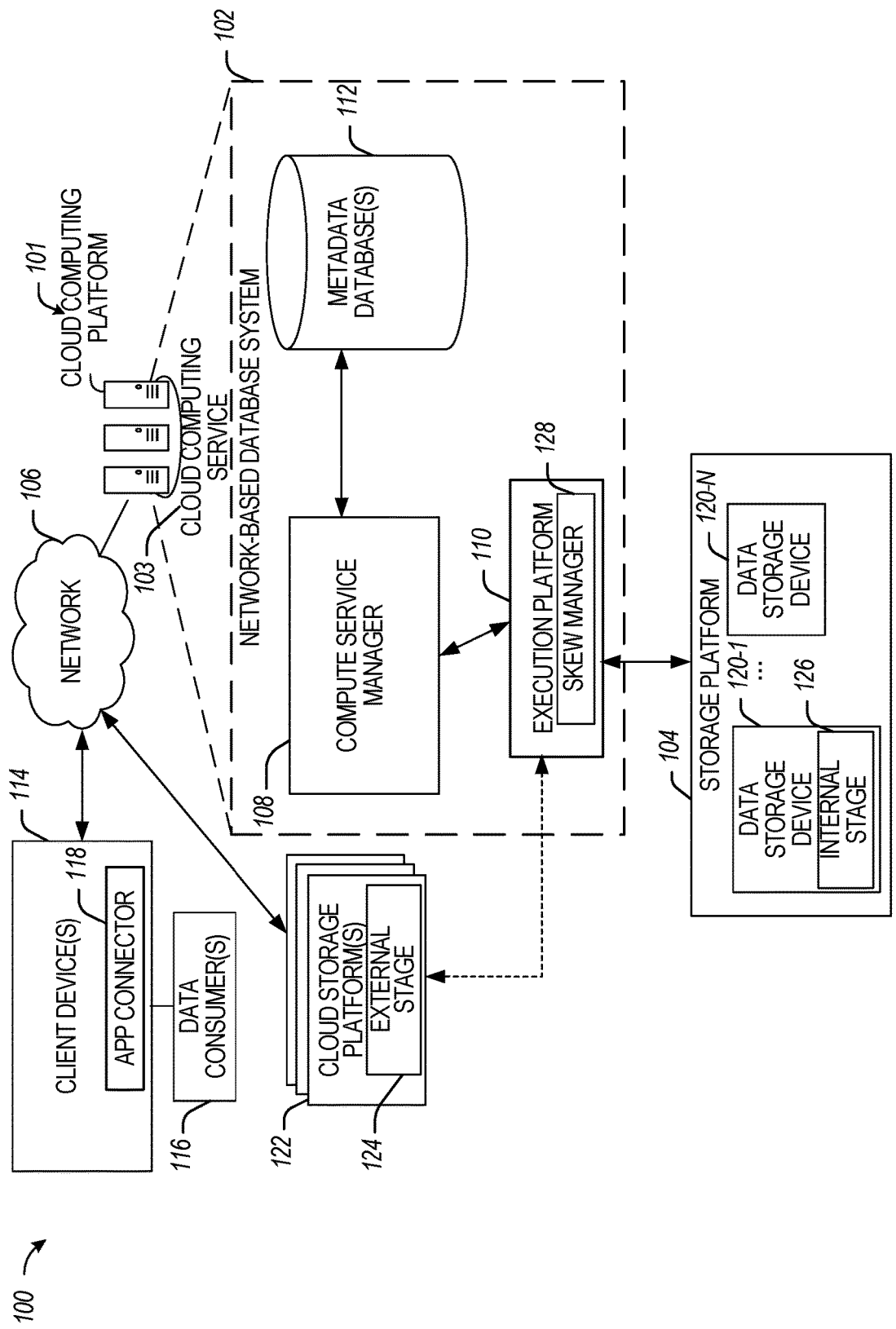
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other examples of unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

As used herein, the term "table" indicates a mutable bag of rows, supporting time travel up to a retention period. As used herein, the term "view" indicates a named SELECT statement, conceptually similar to a table. In some aspects, a view can be secure, which prevents queries from getting information on the underlying data obliquely.

In some aspects, a join operation may be conducted on database data and cause columns from one or more database tables to be merged. Relational databases are often normalized to eliminate duplication of information such as when an entity type may have one-to-many relationships with a plurality of other entity types. A join operation may be utilized to join entity types according to certain join predicates.

A join operation may be utilized in response to a database query to return the appropriate entity types that are requested in the query. In some aspects, a join is an operation in query processing that determines rows in two input streams that "match" with respect to some of their attributes. In an embodiment, those attributes are referred to as join keys. Join operations are typically very time-consuming operations during query execution. A known embodiment of a join operation includes a SQL join clause for combining columns from one or more tables in a relational database. The join clause is a means for combining columns from one or more tables by using values common to each of the one or more tables.

A hash join is an example of a join algorithm that may be used in the implementation of a relational database management system. Various forms of hash joins are commonly used in database systems to compute the result of a join. Hash joins build one or more multiple hash tables with rows of one of the inputs (typically the smaller input) referred to as the "build-side" input. The rows are probed from the other input (typically the larger input) referred to as the "probe-side" input and into the hash tables. In massively parallel database systems with N servers, two distribution strategies are often distinguished: broadcast joins and hash-hash joins (hash-hash joins are also commonly referred to as shuffle joins).

A broadcast join is an example of a join algorithm where a single side of the data to be joined is materialized and sent to a plurality of workers or servers. Broadcast joins are efficient when the build-side input fits into the main memory of a single server. Broadcast joins distribute all rows of the build-side to all N servers and then partition the probe-side over the servers such that each server of the N servers receives only a fraction of the probe-side input. Each of the N servers probes its partition into its copy of the hash table wherein its copy of the hash table includes all data from the build-side input.

Hash-hash joins are often employed where the build-side input does not fit into the main memory of a single server. Hash-hash joins are configured to hash-partition the build-side input across all N servers and then hash-partition the probe-side input with the same partitioning function. In a hash-hash join, each server of the N servers probes its fraction of the probe-side input into its fraction of the build-side. The partitioning function ensures that if a row from probe partition PPi has matches in the build-side, those matches are in the build partition BPi. This leads to equal utilization of all N participating servers during the probe phase of the hash-hash join if the partitioning function partitions the probe input into N partitions of equal size. In particular, if one server receives a disproportionately large amount of probe-side data, it will take much longer than the rest of the servers to process its share of the probe-side. This can stall the rest of the query execution and is often caused by a few frequently occurring join keys on the probe-side, where some rows on the build-side will match many rows on the probe-side. This configuration is referred to as probe-side skew.

In some aspects associated with hash-hash joins, build-side rows are partitioned based on their hash values. If there exists value skew (e.g., a pre-defined number of build-side rows have the same hash value), such rows would all be partitioned to the same worker (or server) performing the join operation. The processing condition when there is only one instance processing most build-side rows is referred to as build-side skew (or build-side value skew). The overloaded worker would further become the bottleneck of the query execution which will impact the query performance.

In some embodiments, the following configurations can be considered for determining whether skew exists: the total number of rows, the number of distinct key values, and the number of instances. In some aspects, if there are a number of rows with the same key value, skew exists if (a) the number of other key values that have a similar number of repetitions is significantly lower than the number of instances; and/or (b) the number of rows with the same key is significant with respect to the number of rows per instance.

In some aspects, a hash join row set operator (RSO) and a hash-hash join RSO can be performed using two RSOs—a hash-join-build (HJB) operator (which can be executed by an HJB instance) and a hash-join-probe (HJP) operator (which can be executed by an HJP instance). The HJB instance is configured to receive hash-partitioned build-side data and communicate the data to the HJP instance (e.g., broadcast to the HJP instance in case of a broadcast join operation, or perform a local synchronization to the HJP instance in case of a hash-hash join operation). The HJP instance is configured to receive the hash-partitioned build-side data as well as hash-partitioned probe-side data, and complete the join operation.

Aspects of the present disclosure provide techniques for using a skew manager to mitigate (e.g., reduce or eliminate) build-side skew by achieving an optimal build-side workload balance. For example, the skew manager can be configured to determine a frequent hash value used for partitioning the most popular build-side row set, and distribute such build-side row sets (which originally would be assigned to the overloaded hash join worker to multiple hash join workers). In some aspects, to ensure correctness, the probe-side rows with the same hash values are broadcasted to the corresponding HJP instances executing at one or more servers performing join operations. In this regard, functionalities performed by the skew manager will result in achieving improved data workload balance when there exists build-side value skewness at hash-hash joins.

The various embodiments that are described herein are described with reference, where appropriate, to one or more of the various figures. An example computing environment using a skew manager for mitigating build-side skew is discussed in connection with FIGS. 1-3. Example join operations are discussed in connection with FIGS. 4-15. Example functionalities of the skew manager are further discussed in connection with FIGS. 16-18. A more detailed discussion of example computing devices that may be used in connection with the disclosed techniques is provided in connection with FIG. 19.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, storage platforms 104, and cloud storage platforms 122. The cloud computing platform 101 provides computing resources and storage resources that may be acquired (purchased) or leased (e.g., by data providers and data consumers), and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities (e.g., performing the skew mitigation functions described herein). The cloud computing platform 101 may include a three-tier architecture: data storage (e.g., storage platforms 104 and 122), an execution platform 110, and a compute service manager 108 providing cloud services. In some embodiments, the execution platform 110 is configured to provide services associated with mitigation of build-side skew using a skew manager 128.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage), client device 114 (e.g., a data provider), and data consumer 116 via network 106. The network-based database system 102 is a network-based system used for reporting and analysis of integrated data from one or more disparate sources including one or more storage locations within the cloud storage platform 104. The storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services (as well as additional services such as the disclosed skew mitigation functions) to multiple client accounts, including an account of the data provider associated with client device 114 and an account of the data consumer 116. In some embodiments, the execution platform 110 comprises the skew manager 128 which can be used in connection with skew-related functions. Example skew-related functions include determining a frequent hash value, notifying processing nodes or servers of the frequent hash value, configuring hash-partitioned build-side data to be distributed to multiple worker nodes or servers handling hash-join-build instances, and so forth. A more detailed description of the functions provided by the skew manager 128 is provided in connection with e.g., FIGS. 16-18.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, accounts of data providers, accounts of data consumers, system administrators managing the systems and methods described herein, and other components/devices that interact with the compute service manager 108.

The compute service manager 108 is also in communication with a client device 114. The client device 114 corresponds to a user of one of the multiple client accounts (e.g., a data provider) supported by the network-based database system 102. The data provider may utilize application connector 118 at the client device 114 to submit data storage, retrieval, and analysis requests to the compute service manager 108 as well as to access or configure other services provided by the compute service manager 108 (e.g., services associated with the disclosed skew-related functions).

Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, a notification to a user may be understood to be a notification transmitted to client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some aspects, a data consumer 116 can communicate with the client device 114 to access functions offered by the data provider. Additionally, the data consumer can access functions (e.g., skew-related functions) offered by the network-based database system 102 via network 106.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources (e.g., execution nodes) that execute, for example, various data storage, data retrieval, and data processing tasks. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, communication links between elements of the computing environment 100 are implemented via one or more data communication networks, such as network 106. The one or more data communication networks may utilize any communication protocol and any type of communication medium. In some embodiments, the data communication networks are a combination of two or more data communication networks (or sub-networks) coupled with one another. In alternate embodiments, these communication links are implemented using any type of communication medium and any communication protocol.

The compute service manager 108, metadata database 112, execution platform 110, and storage platform 104, are shown in FIG. 1 as individual discrete components. However, each of the compute service manager 108, metadata database 112, execution platform 110, and storage platforms 104 and 122 may be implemented as a distributed system (e.g., distributed across multiple systems/platforms at multiple geographic locations). Additionally, each of the compute service manager 108, metadata database(s) 112, execution platform 110, and storage platforms 104 and 122 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
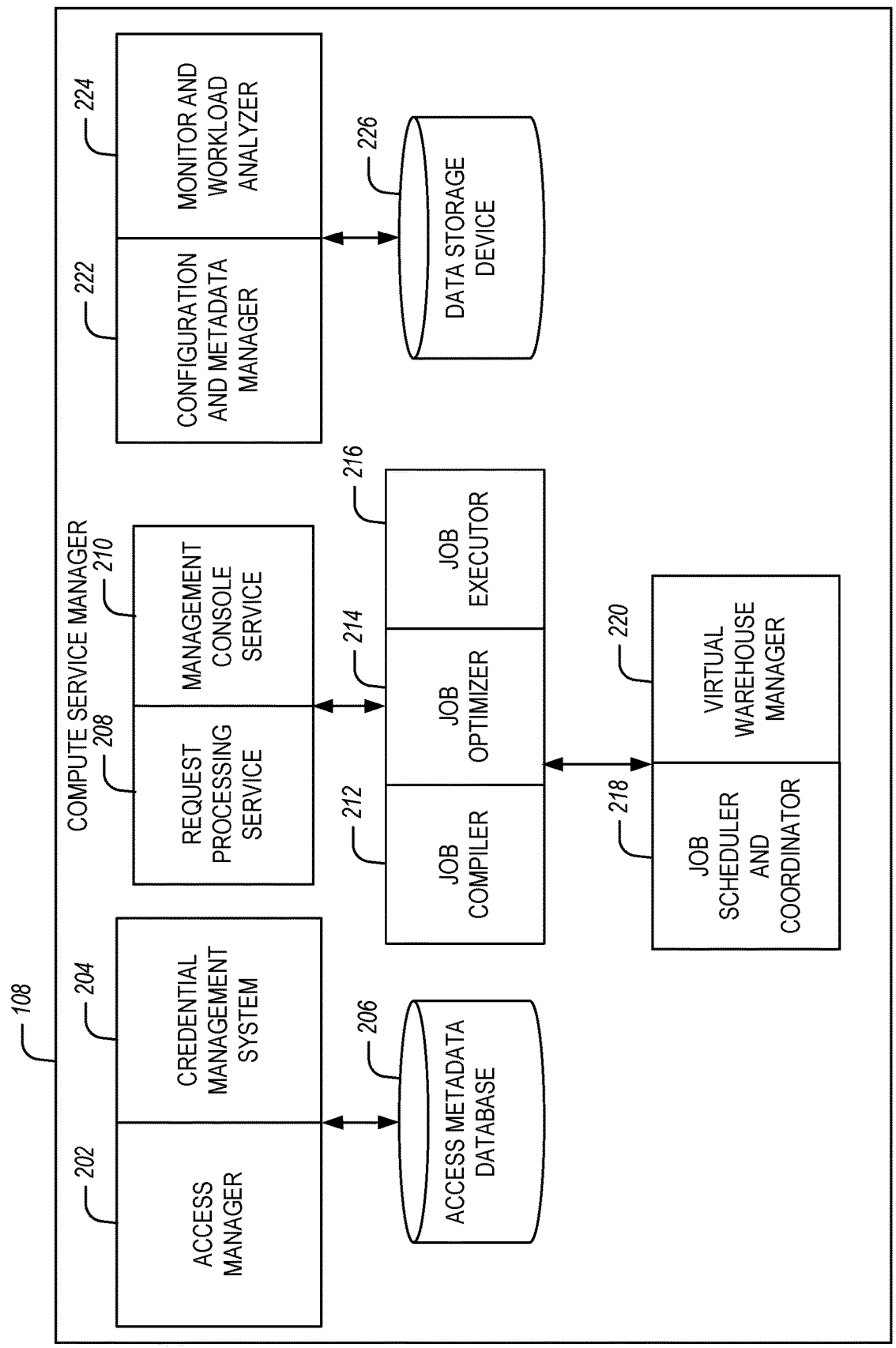
FIG. 2 is a block diagram illustrating the components of a compute service manager using a skew manager, in accordance with some embodiments of the present disclosure.

FIG. 2 is a block diagram illustrating the components of the compute service manager 108 using a skew manager, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in the execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
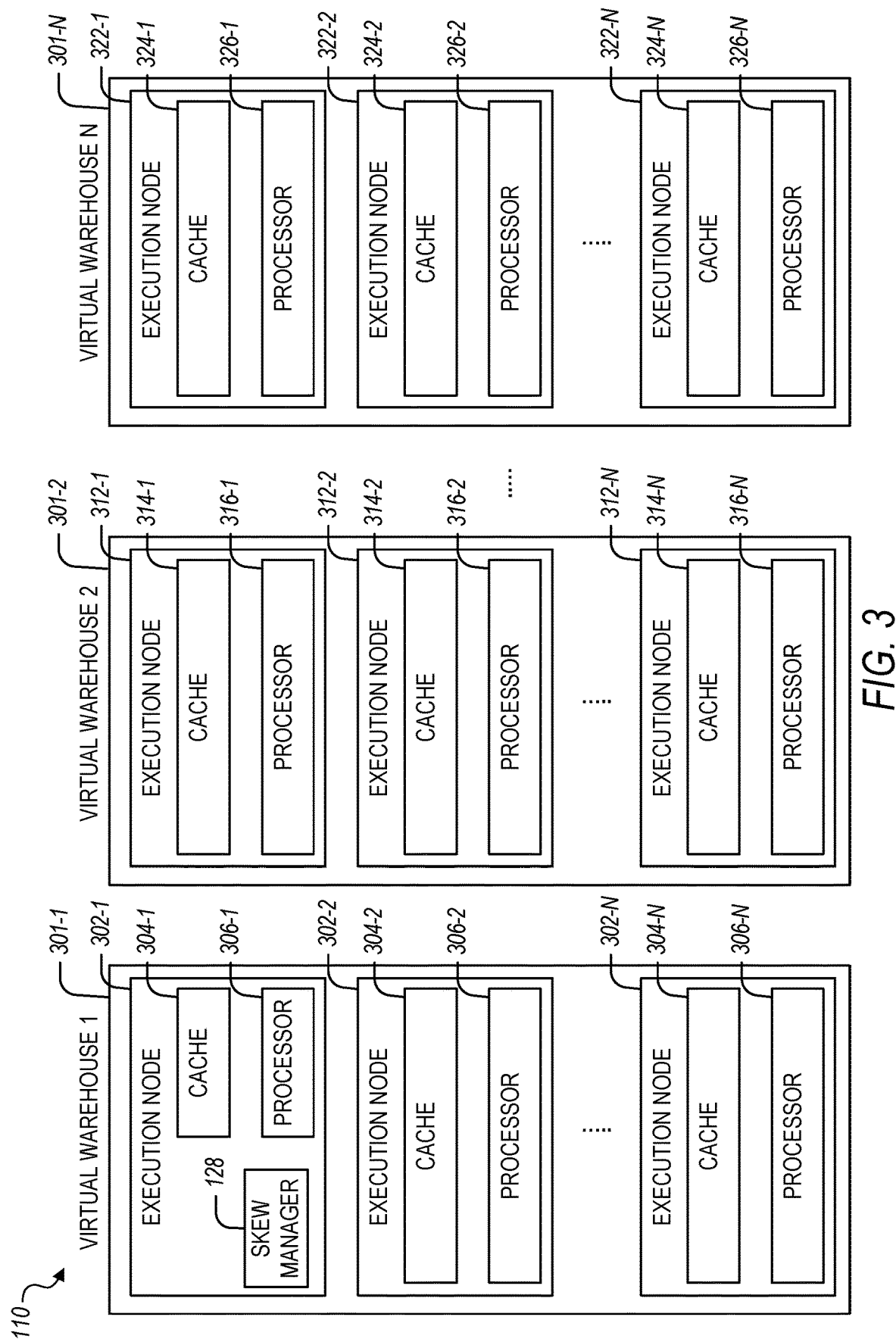
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, . . . , and N may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

In some embodiments, the execution platform 110 further includes the skew manager 128 which can be used in connection with skew-related functions disclosed herein. For example and as seen in FIG. 3, the skew manager 128 is implemented in execution node 302-1. Even though the skew manager 128 is illustrated as a separate module within the execution platform 110, the disclosure is not limited in this regard and other configurations of the skew manager 128 can be used as well. For example, one or more of the functionalities of the skew manager 128 can be implemented as stand-alone modules in one or more servers of the compute service manager service manager 108.

FIG. 4 illustrates an example join operation 400. The join operation 400 results in result table 420 are constructed based on a join operation to the build-side table 402 and the probe-side table 410. The build-side table 402 is smaller than the probe-side table 410 as illustrated in FIG. 4. The build-side table includes two attributes (columns) including bKey 404 and bVal 406. The probe-side table 410 further includes two attributes pKey 412 and pVal 414. The result table 420 indicates the result of the join operation 400 wherein bKey 404 is equal to pKey 412. The join operation 400 pairs up every row from the build-side table 402 with every row from the probe-side table 410 and then eliminates those rows where the attribute bKey 404 does not match the attribute pKey 412. In a hash join operation, the smaller table (in this case, the build-side table 402) will be called the "build-side" and the larger table (in this case, the probe-side table 410) will be called the "probe-side." The order in which rows are depicted in any of the tables is not relevant. It should be appreciated that the systems and methods of the disclosure may be implemented where the build-side table is not the smaller table and is instead the larger table. Such an implementation would not impact the ability to leverage the skew handling techniques as disclosed herein.

As an example as illustrated in FIG. 4, there is a bKey 404 value equal to "42" that is associated with the bVal 406 value "X." Additionally there is a pKey 412 value "42" that is associated with the pVal 414 value "d." As illustrated in the result table 420 where bKey is equal to pKey, the bKey 404 value of "42" is matched with the pKey 412 value of "42," returning bVal 406 and pVal 414 values of "X" and "d," respectively.

As illustrated in FIG. 4, where there is a build-side key value (bKey 404) in the build-side table 402 that is not represented as a probe-side key value (pKey 412) in the probe-side table 410, any rows including that value do not appear in the result table 420. Similarly, where there is a probe-side key value (pKey 412) in the probe-side table 410 that is not represented as a build-side key value (bKey 404) in the build-side table 402, any row including that value is not included in the result table 420. An example of such a row in the build-side table 402 is [512,W] because the "512" key is not represented in the probe-side table 410. Examples of such rows in the probe-side table 410 include [2,a] and [2003,f] because the "2" key and the "2003" key are not represented in the build-side table 402.

FIGS. 5-8 illustrate data tables representing steps associated with a broadcast join operation. FIG. 5 illustrates an example set of tables for a join in a parallel database system, wherein FIG. 5 illustrates the tables before broadcast 500. In a parallel database system with multiple servers, data may be structured as illustrated in FIG. 5 before the join operation. It should be appreciated that any number of servers may be involved in a broadcast join operation, and the figures herein illustrate two servers for simplicity in illustrating the join operation.

Each server, including server one 501 and server two 521 include a build-side table (also referred to as a build table) and a probe-side table (also referred to as a probe table). Server one 501 includes a build table B.1 502 and a probe table P.1 510. Server two 521 includes a build table B.2 520 and a probe table P.2 530. The build table B.1 502 includes bKey 504 values and bVal 506 values, and the probe table P.1 510 includes pKey 512 values and pVal 514 values. The build table B.2 520 includes bKey 522 values and bVal 524 values, and the probe table P.2 530 includes pKey 532 values and pVal 534 values. An issue as illustrated in FIG. 5 is that server one 501 includes some rows (see e.g. [42,X]) that need to be joined with one or multiple rows of a probe table that reside on a different server (see e.g. [42,d] located on server two 521). To perform the join, the tables need to be repartitioned or redistributed in a way that allows efficient computation of the join operation. Depending on the size of the build table (typically the smaller table), this can be achieved via a broadcast join operation or a hash-hash join operation.

In an embodiment, FIG. 5 illustrates a broadcast join with the assumption that the combination of build table B.1 502 and build table B.2 520 is small enough to fit into the memory of a single server. The build-side is broadcasted to ensure that every server has all the rows of each of build table B.1 502 and build table B.2 520. Afterward, each server can probe the subset of a probe table (e.g., probe table P.1 510 or probe table P.2 530) that it owns into the hash table to find matches.

FIG. 6 illustrates the same overall table values as illustrated in FIG. 5 but after the broadcast of the build-side 600 of the join operation. As illustrated in FIG. 6, after the broadcast of the build-side 600, each server (e.g., server one 501 and server two 521) includes a complete copy of the broadcasted build table 602. The broadcasted build table 602 includes all values of the build-side of the join operation, including values stored in build table B.1 502 and build table B.2 520. The probe-side of the join operation (e.g., probe table P.1 510 and probe table P.2 530) is not altered by the broadcasting of the build-side to each server.

FIG. 7 illustrates the same overall table values as illustrated in FIGS. 5-6, but after probing the probe-side 700 of the join operation such that the final result of the join operation is illustrated. Server one 501 has generated a result R.1 702. Server two 521 has generated a result R.2 720. The union of result R.1 702 and result R.2 720 provides the final result. Each server (e.g., server one 501 and server two 521) probes its subset of the probe-side table (e.g., probe table P.1 510 and probe table P.2 530) into the broadcasted build table 602. It should be appreciated that the broadcasted build table 602 may alternatively be referred to as the hash table. Thus, each server computes a part of the result and the combined results of all servers yields the correct overall result of the join.

FIG. 8 illustrates the final result 800 of the broadcast join operation computed based on the table values illustrated in FIGS. 5-7. The final result 800 includes bKey and bVal values originally found in the build-side of the join operation. The final result 800 further includes pKey and pVal values originally found in the probe-side of the join operation. The final result 800 is the union of result R.1 702 and result R.2 720 which were determined after probing the probe-side of the j oin.

Figure 11:
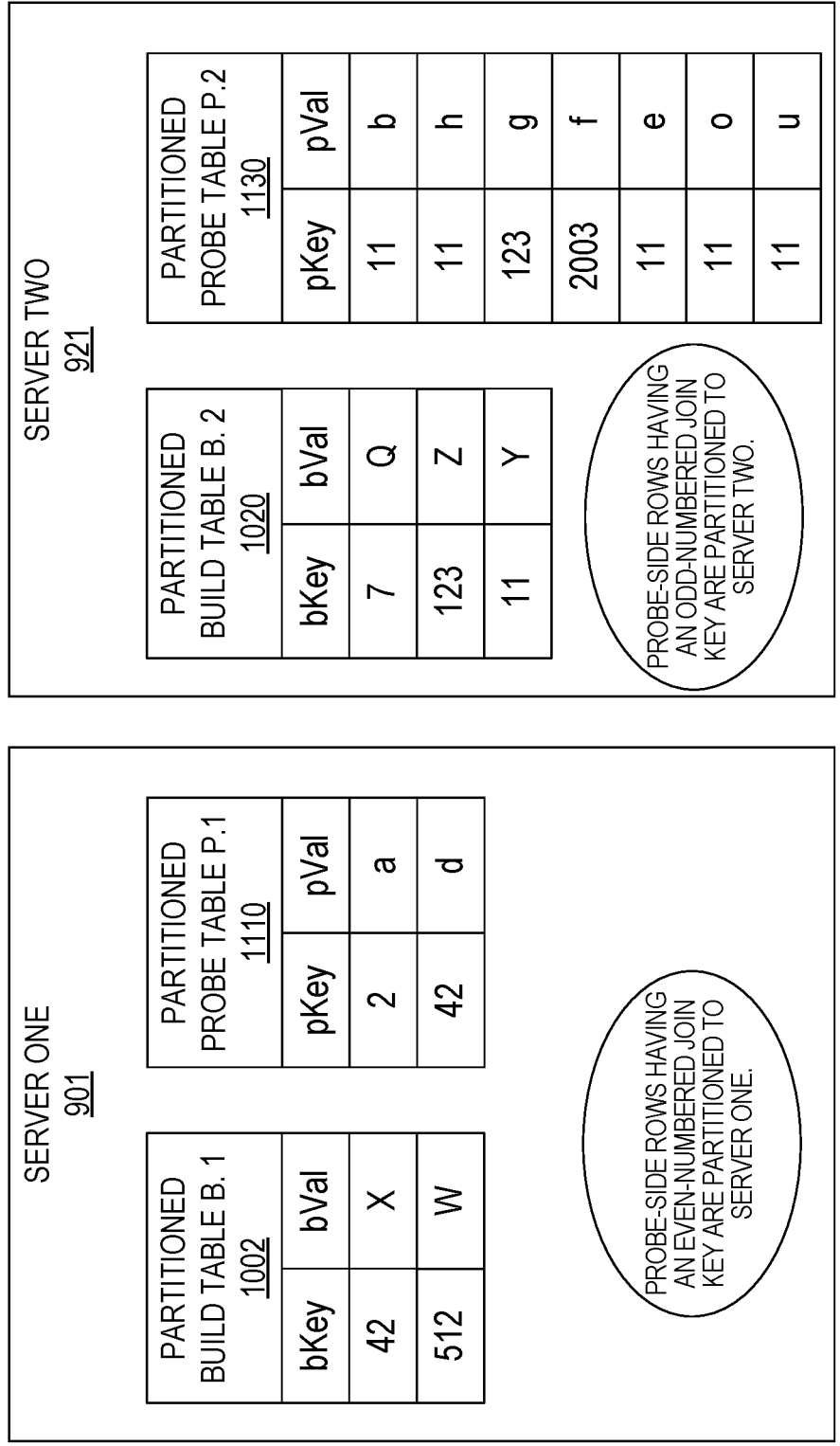
FIG. 11 is a schematic diagram illustrating an example join operation, in accordance with some embodiments of the present disclosure.

FIGS. 9-11 illustrate data tables representing various steps of a hash-hash join operation. Applicant notes that FIGS. 9-11 include the same overall table values as illustrated in FIGS. 5-8 for simplicity in illustrating differences between a broadcast join and a hash-hash join. A hash-hash join is commonly implemented where the totality of the build-side comprises too much data to fit into the main memory of a single server. Both the build-side data and the probe-side data are hash-partitioned or redistributed to break up the total work into equal parts. For simplicity, FIGS. 9-11 illustrate a simple hash-partitioning function that will send each row where a join key is an even number to server one 901 and send each row where a join key is an odd number to server two 921. During the build phase of the join, each server will hash-partition every row of the build-side (see build table B.1 902 and build table B.2 920). The probe-side is then redistributed according to the same hash function. Each server can thus compute its part of the result locally.

FIG. 9 illustrates data tables on server one 901 and server two 921 before hash partitioning 900. Thus, FIG. 9 may represent the original data stored on one or more remote servers before a join operation is commenced. It should be appreciated that any number of servers may be involved in a hash-hash join, and the figures herein illustrate two servers for simplicity. Server one 901 includes a build table B.1 902 having bKey 904 values and bVal 906 values. Server one 901 further includes a probe table P.1 910 having pKey 912 and pVal 914 values. Server two 921 includes a build table B.2 920 having bKey 922 values and bVal 924 values. Server two 921 further includes a probe table P.2 930 having pKey 932 values and pVal 934 values.

The key values (see bKey 904, pKey 912, bKey 922, and pKey 932) constitute join keys. The join keys indicate how a match may be made between data stored in a build-side of the join and data stored in a probe-side of the join. That is, the final result of the join operation mandates that the bKey values match the pKey values. Where a build-side join key corresponds with, i.e. matches, a probe-side join key, the build-side row, and the probe-side row may be joined.

FIG. 10 illustrates the same overall table values as in FIG. 9 after hash partitioning of the build-side 1000. FIG. 10 illustrates the result of the build phase of the join operation. During the build phase of the join operation, each server hash-partitions each row of the build-side (e.g., build table B.1 902 and build table B.2 920) to generate new partitioned build tables (e.g., partitioned build table B.1 902 and partitioned build table B.2 920). The probe-side tables remain the same (e.g., probe table P.1 910 and probe table P.2 930). Server one 901 includes partitioned build table B.1 1002 and probe table P.1 910. Server two 921 includes partitioned build table B.2 1020 and probe table P.2 930.

For simplicity, a simple hash-partitioning function is used in an embodiment as illustrated in FIG. 10 such that each build-side row having an even-numbered join key (see bKey 804 and bKey 822) is sent to server one 901 and each build-side row having an odd-numbered join key (see bKey 904 and bKey 922) is sent to server two 921. During the build phase of the join operation, each server will hash-partition every row of the build-side. For example, server one 901 will keep row [42,X] of build table B.1 902 because the join key (42) is an even number. Server one 901 will send row [11,Y] to server two 921 because the join key (11) is an odd number. Server two 921 will send row [512,Z] to server one 901 because the join key (512) is an even number. Server two will keep rows [7,Q] and [123,Z] because the join keys (7 and 123) are odd numbers.

FIG. 11 illustrates the same overall table values as in FIGS. 9-10 after hash partitioning of the probe-side 1100. The probe-side (e.g., probe table P.1 910 and probe table P.2 930) is redistributed according to the same hash function used with respect to the build-side as illustrated in FIG. 10. That is, probe-side rows having an even-numbered join key are partitioned to server one 901 and probe-side rows having an odd-numbered join key are partitioned to server two 921. As illustrated in FIG. 11, the partitioned probe table P.1 1110 on server one 901 includes rows having an even-numbered join key including [2,a] and [42,d]. The partitioned probe table P.2 1130 on server two 921 includes rows having an odd-numbered join key including [11,b], [11,h], [123,g], [2003,f], [11,e], [11,o], and [11,u]. As such, each server can compute its part of the join result locally.

In an embodiment, the results of the partitioned probe data (e.g., partitioned probe table P.1 1110 and partitioned probe table P.2 1130) are not stored on the respective servers after the probe-side data has been partitioned. Rather, the partitioned probe data is streamed through a server such that each probe data row either remains on the current server or is transmitted to a remote server. Either way, the probe data row is immediately probed into the hash table (e.g., the respective partitioned build table) and matched with one or more rows of the build-side. The resulting rows are transmitted to the next operator of the query execution logic.

FIG. 12 illustrates the partitioned result 1200 after probing the partitioned probe data (e.g., partitioned probe table P.1 1110 and partitioned probe table P.2 1130) into the partitioned build data (e.g., partitioned build table B.1 1002 and partitioned build table B.2 1020). Server one 901 returns result R.1 1202 and server two 921 returns result R.2 1204. The final result of the hash-hash join operation includes the union of result R.1 1202 and result R.2 1204. As such, the final result of the hash-hash join operation is computed locally by one or more servers, and the individual results of each of the individual servers is combined to generate the final result.

As illustrated in FIG. 12, the partitioned result 1200 includes data skew characterized by server two 921 having more data than server one 901. Result R.2 1204 includes many more rows of data than result R.1 1202. This is caused by the presence of more rows having an odd-numbered join key than rows having an even-numbered join key, which is also referred to as probe-side data skew. In an embodiment as illustrated in FIG. 12, server two 921 would take much longer to finish its part of the join operation work.

In some embodiments, build-side data (e.g., build-side row sets, also referred to as build-side rows) are partitioned based on their hash values. If there exists value skew (e.g., most build-side rows have the same hash value), the build-side rows would all be partitioned to the same worker (e.g., server) resulting in build-side skew. The disclosed techniques can be used to mitigate (or prevent) build-side skew by configuring more than one instance (e.g., a hash-join-build or HJB instance) to process hashed build-side data (e.g., redistributing the workload among multiple instances) and achieve better build-side workload balance with minimal overhead.

Figure 13:
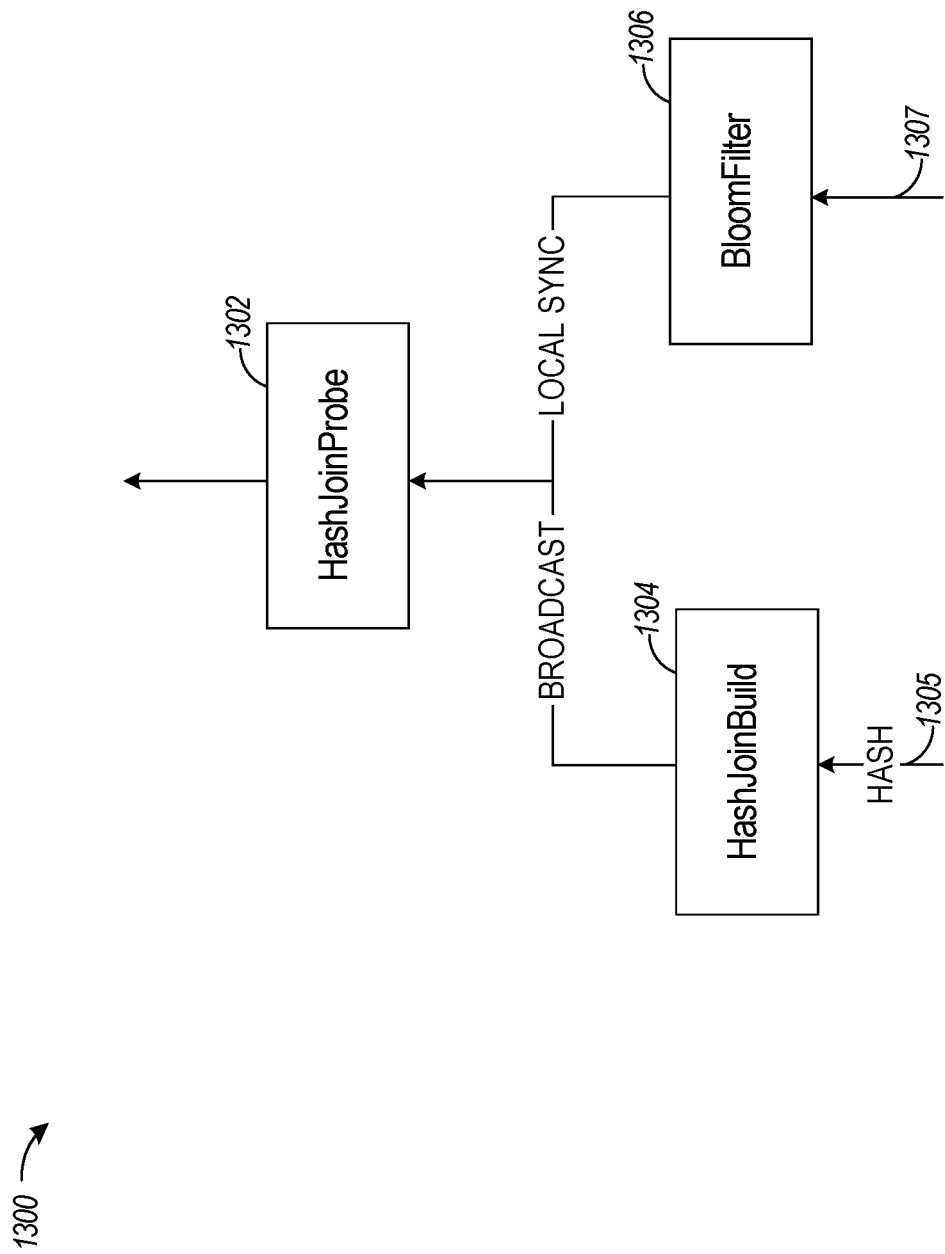
FIG. 13 is a schematic diagram illustrating an example broadcast join operation, in accordance with some embodiments of the present disclosure.

FIG. 13 is a schematic diagram illustrating an example broadcast join operation 1300, in accordance with some embodiments of the present disclosure. FIG. 13 illustrates the build side of the broadcast join operation 1300 includes an HJB instance 1304 receiving hashed build-side data 1305 from a hash link producer. The probe side of the broadcast join operation includes a filter (e.g., a Bloom filter) 1306 receiving probe-side data 1307, which is filtered and communicated to (e.g., synchronized to) the HJP instance 1302. The HJP instance 1302 receives the build-side data from the HJB instance 1304 (e.g., via broadcast) and completes the join operation using the build-side data and the probe-side data.

At the incoming link of the HJB instance 1304, rows are distributed by hash so that each HJB instance gets a different slice of data. When the HJB instance 1304 terminates, it decides if it should broadcast all data or not based on the total number of hashed build-side rows. This decision determines whether the hash join operation is executing as a broadcast join or a hash-partitioning hash join (or hash-hash join). In broadcast joins (e.g., as illustrated in FIG. 13), a local instance i of HJB (e.g., HJB instance 1304) will send the build-side data it has to the instance i of HJP (e.g., MP instance 1302) in all joint operation processes. The probe-side rows (e.g., the filtered probe-side data 1307) are passed to the local HJP instance (e.g., HJP instance 1302) synchronously.

Figure 14:
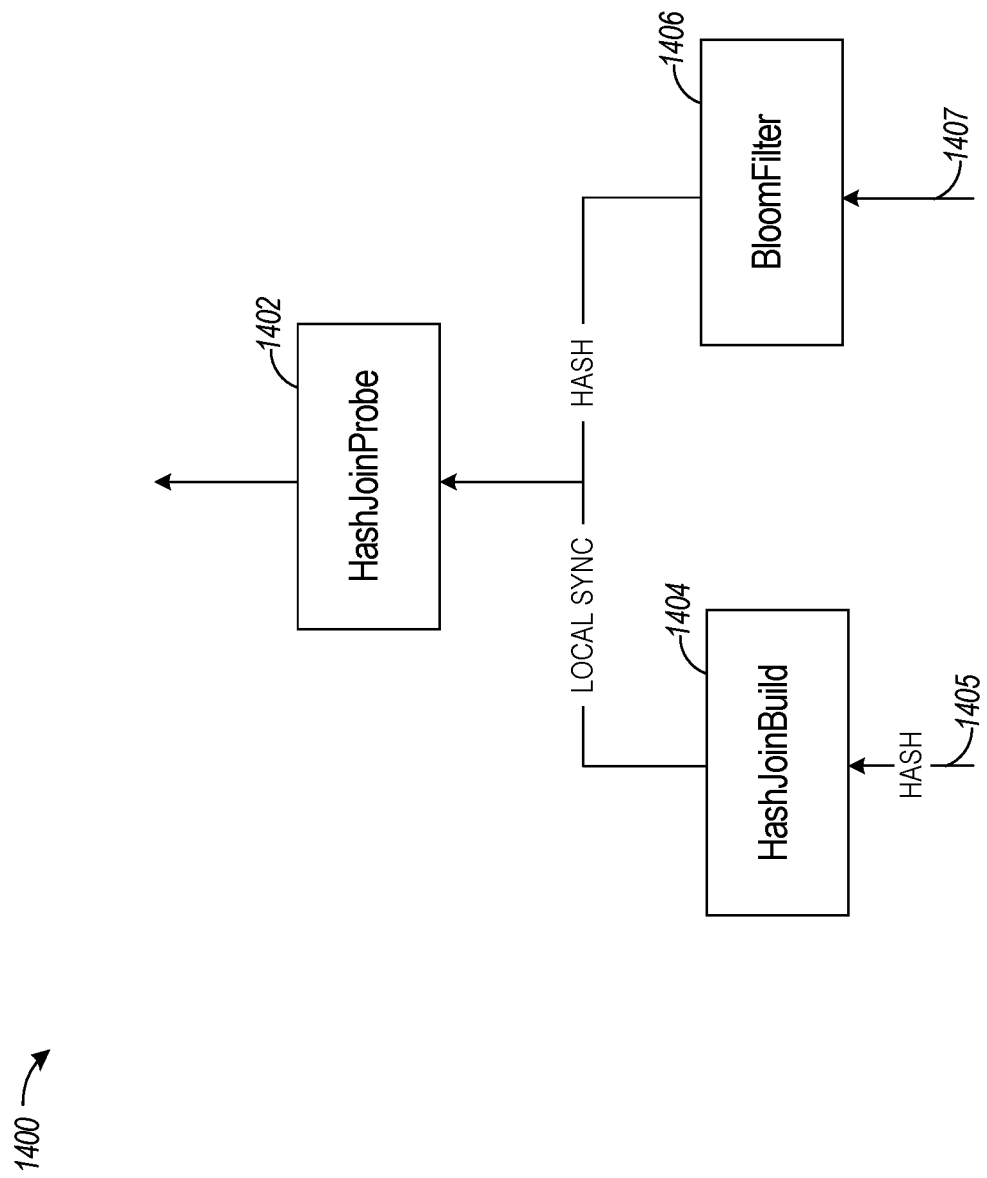
FIG. 14 is a schematic diagram illustrating an example hash-hash join operation, in accordance with some embodiments of the present disclosure.
Figure 16:
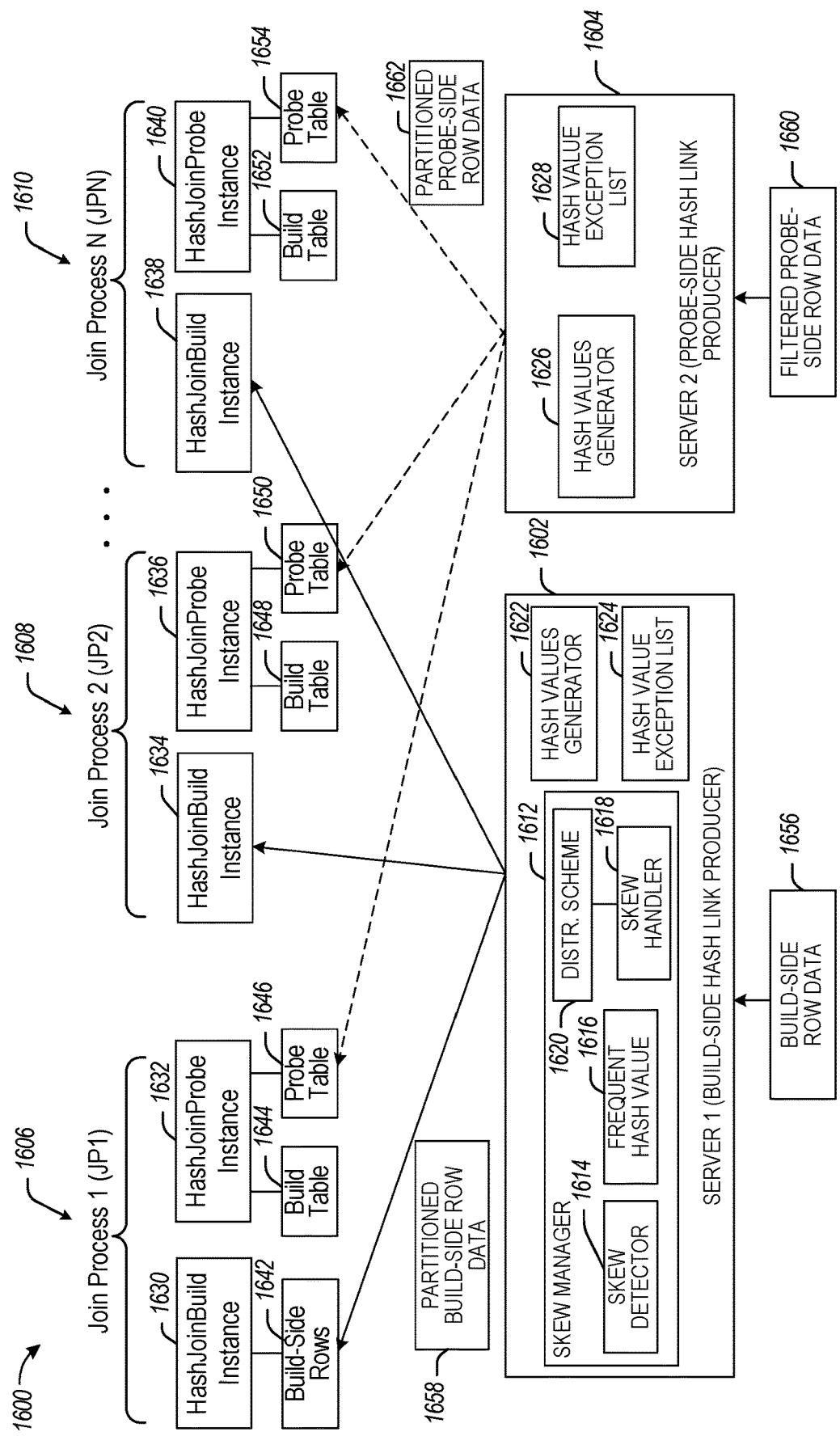
FIG. 16 is a schematic diagram illustrating skew handling techniques in a data processing system, in accordance with some embodiments of the present disclosure.

FIG. 14 is a schematic diagram illustrating an example hash-hash join operation 1400, in accordance with some embodiments of the present disclosure. FIG. 14 illustrates the build side of the hash-hash join operation 1400 includes an HJB instance 1404 receiving hashed build-side data 1405 from a hash link producer (e.g., example hash link producers are illustrated in FIG. 16). The probe side of the hash-hash join operation includes a filter (e.g., a Bloom filter) 1406 receiving probe-side data 1407, which is filtered, hashed, and communicated to the HJP instance 1402. The HJP instance 1402 receives the hashed build-side data from the HJB instance 1404 (e.g., via a local synchronization) and completes the hash-hash join operation using the hashed build-side data and the hashed probe-side data.

In some embodiments, each of the instances discussed herein (as well as any hash link producers that perform the data hashing or hash partitioning) can be configured to execute on a separate worker node (or server). In other embodiments, multiple instances can execute on the same server.

If row data is not broadcast in the HJB instance, the hash-hash join operation 1400 is performed, with each worker node (or server) processing a different hash partition. In this case, a local instance i of HJB (e.g., HJB instance 1404) will only pass what it has to the local instance i of HJP (e.g., HJP instance 1402) in the same process. On the probe-side, probe-side rows are hash partitioned across multiple instances.

In some aspects, build-side skew is caused when certain HJP instances are overloaded with build-side rows during a hash join operation. An example of build-side skew is indicated in FIG. 15.

Figure 15:
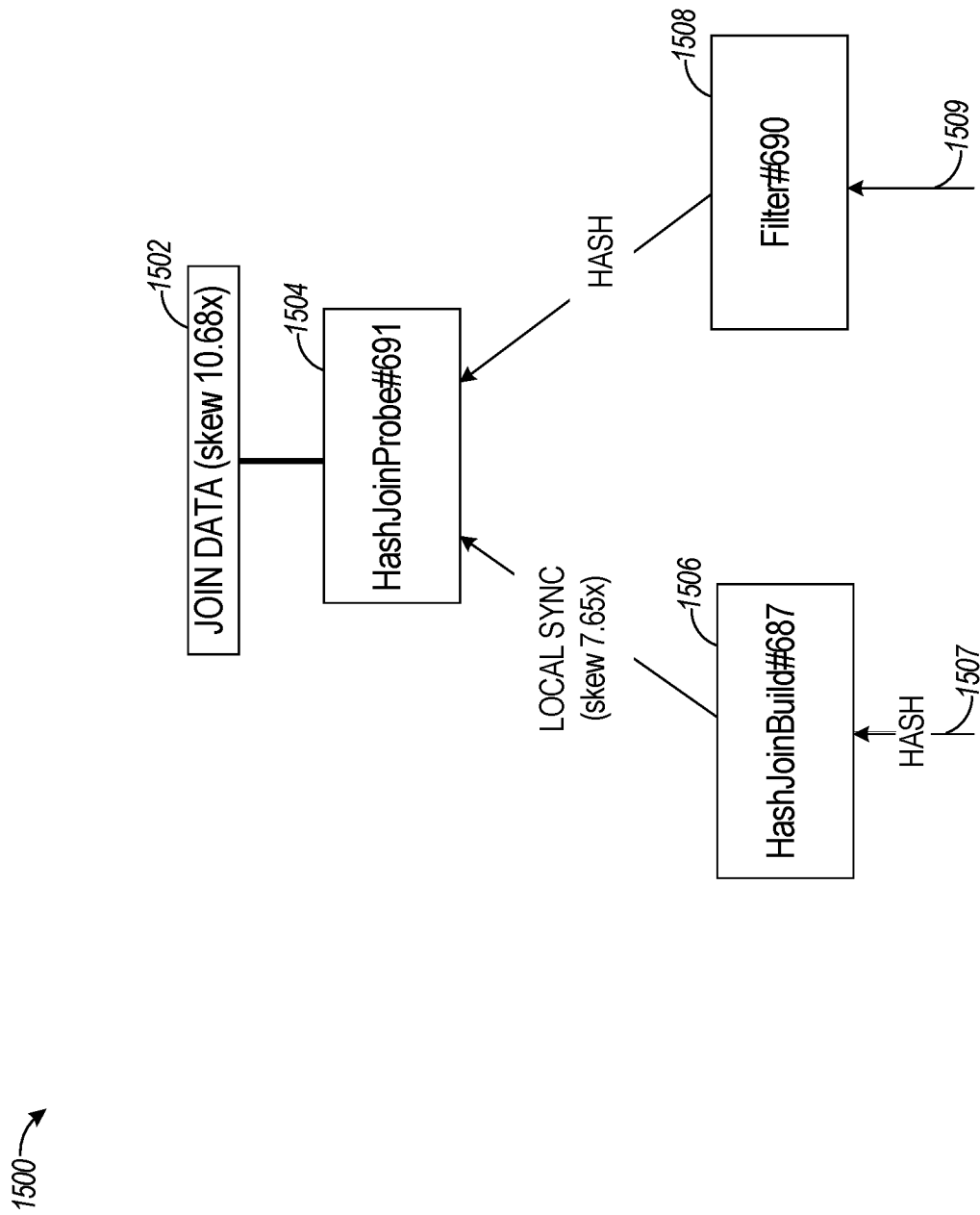
FIG. 15 is a schematic diagram illustrating an example build-side skew in connection with a hash-hash join operation, in accordance with some embodiments of the present disclosure.

FIG. 15 is a schematic diagram illustrating an example build-side skew in connection with a hash-hash join operation 1500, in accordance with some embodiments of the present disclosure. The hash-hash join operation 1500 includes an HJB instance 1506 receiving hash-partitioned build-side data 1507, a filter 1508, and an HJP instance 1504 receiving hash-partitioned probe-side data 1509 and generating join data 1502.

At the incoming link of the HJB instance 1506, rows are hash partitioned to instances. If there exists a popular hash value (also referred to as a frequent hash value), rows with this hash value might be partitioned to the same instance which results in skewness. In some embodiments, there are two kinds of skewness depending on the distribution of build-side rows processed HJP instances:

(a) global build-side skewness: one HJP node has to process much more build-side rows than other nodes. This type of skewness can result in an overloaded instance in an overloaded HJP node. For example, the "skew 7.65×" referenced for the hash-partitioned data communicated by the HJB instance 1506 in FIG. 15 indicates the existence of a global build-side skew of 7.65. The skew ratio of 7.65 equals the number of rows processed by the overloaded instance divided by the average number of rows each instance is supposed to get.

(b) local build-side skewness: one HJP instance has to process significantly more rows than other instances in the same node. However, workload distribution among nodes can be balanced.

The build-side skewness coming from hash partitioning may change depending on whether the hash join is a broadcast join or a hash-hash join. The broadcast join may not be associated with a global build-side skew as every node ends up processing all build-side rows. However, a broadcast join may be associated with a local build-side skew when there is one overloaded local instance because, during a broadcast, a local instance i of HJB will send what it has to the instance i of HJP in other nodes. The workload distribution among instances within a node may not change during a broadcast.

In some aspects, a hash-hash join operation can be associated with both a global build-side skew and a local build-side skew. Since an HJB instance synchronously passes rows to its local HJP instance, the skewness may not change during execution. The skewness at the HJP instance can be dependent on the hash partitioning results.

In some aspects, existing skew detection-related usage tracking at the RSO instances can help with identifying production queries with build-side skew. In some embodiments, global build-side skew may occur more often when the number of worker nodes (or servers) is greater than a threshold (e.g., 16 servers). In some aspects, there can be only one overloaded instance in the overloaded node. In some embodiments, when a join suffers from a global build-side skew, the number of probe-side rows of global skew can be smaller than a threshold (e.g., 100$k$ rows). There are many cases where the build-side has billions of rows while the probe-side only has hundreds of rows, which is indicative of skew.

The disclosed skew mitigation techniques can be used in connection with handling global build-side skew in hash-hash joins because the overloaded node/instance usually becomes the bottleneck of a query due to the following expensive operations: building hash tables and sending results (e.g., results for build-side touching joins or results from probe-side rows that match the skewed build-side rows).

In some embodiments, the disclosed skew mitigation techniques can be configured to use local decisions, use async mechanisms (whenever possible to avoid additional global synchronization points), and use the existing synchronization point where we make the broadcast join versus hash-hash join decision. In some aspects, this decision can be broadcasted to all probe side nodes (e.g., hash link producers and other servers involved in the join operation).

Figure 17:
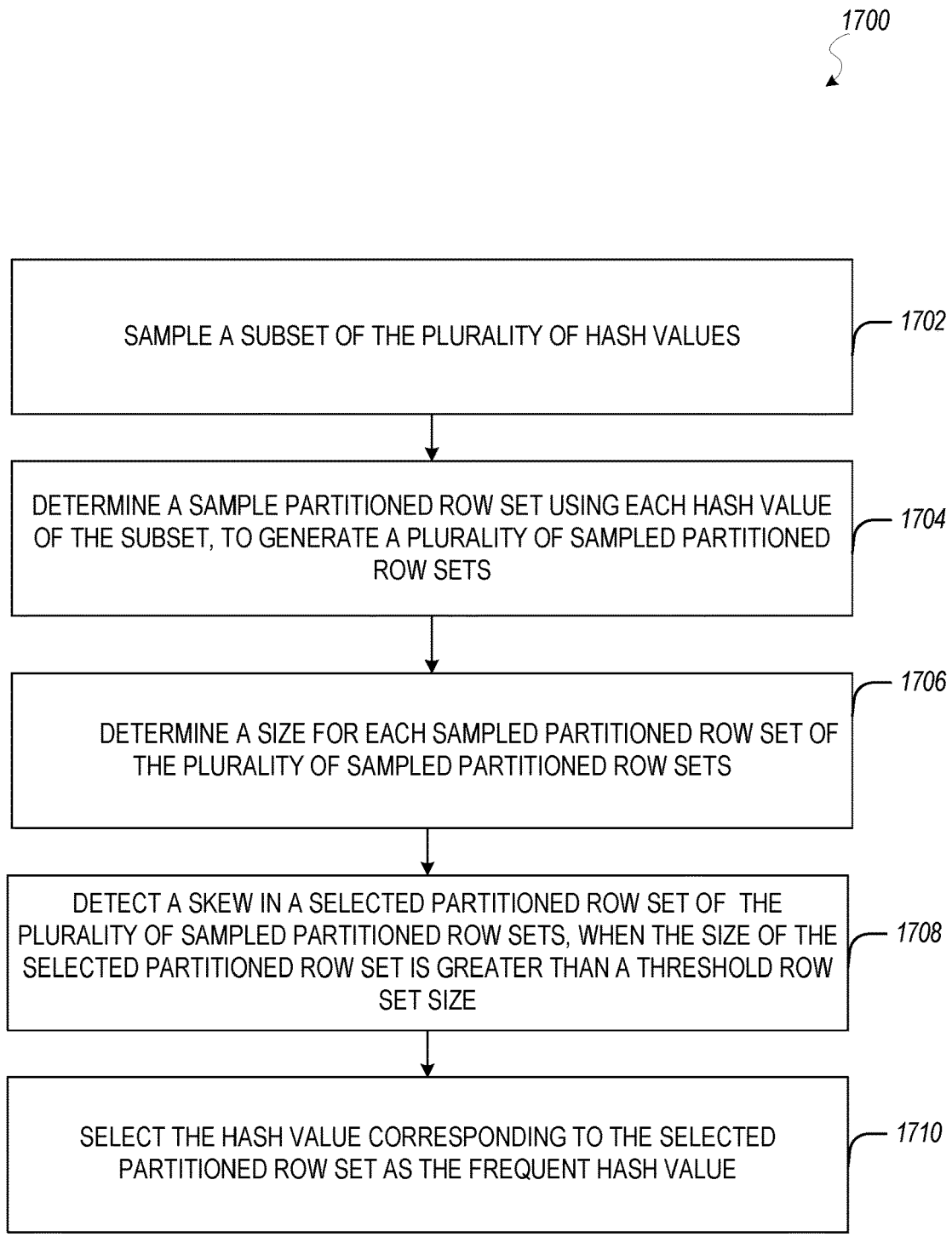
FIG. 17 is a flow diagram illustrating the operations of a database system in performing a method for detecting a frequent hash value, in accordance with some embodiments of the present disclosure.
Figure 18:
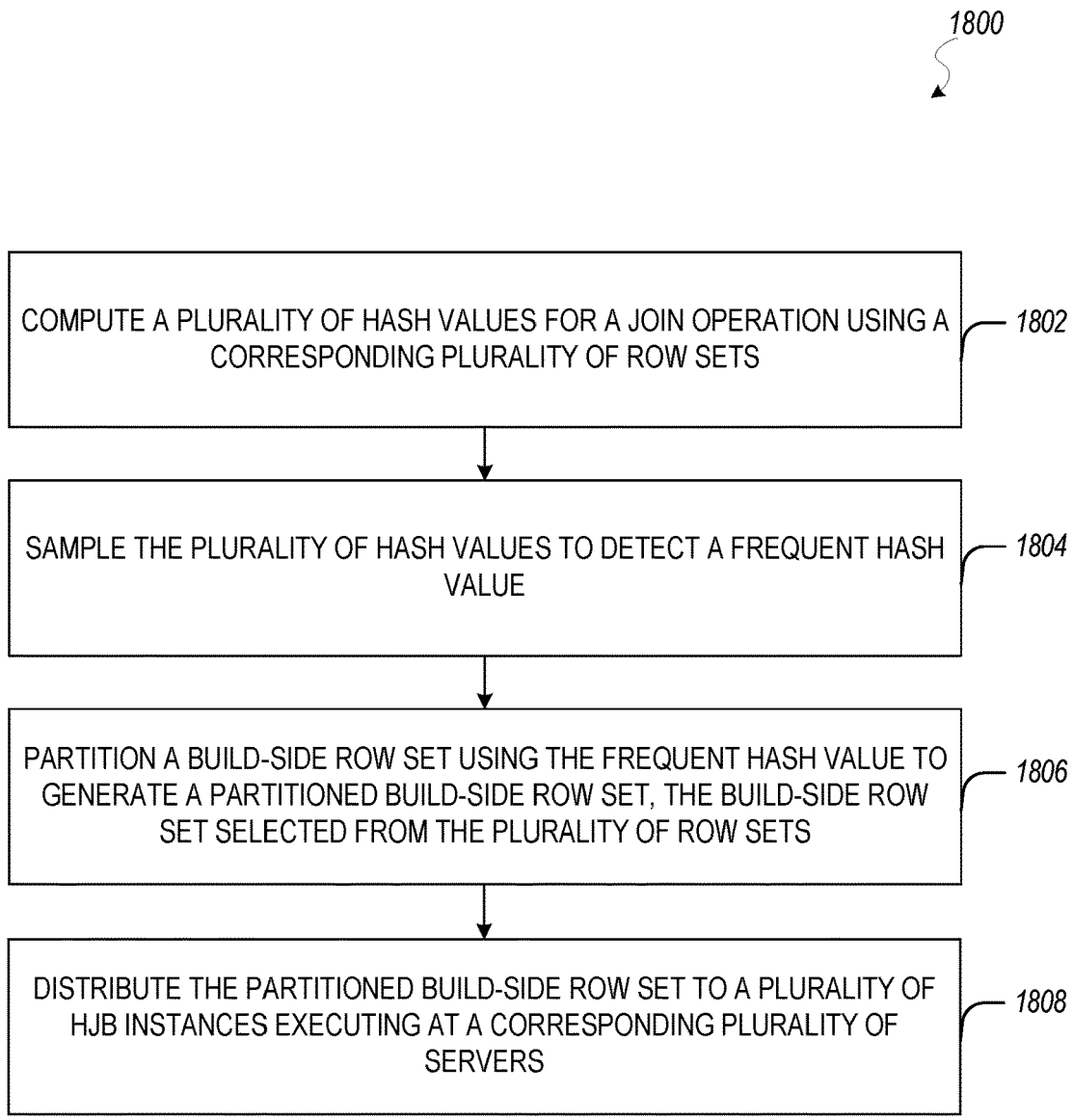
FIG. 18 is a flow diagram illustrating the operations of a database system in performing a method for build-side skew handling, in accordance with some embodiments of the present disclosure.

A more detailed description of the skew mitigation techniques is provided in connection with FIGS. 16-18.

FIG. 16 is a schematic diagram illustrating skew handling techniques in a data processing system 1600, in accordance with some embodiments of the present disclosure. More specifically, FIG. 16 illustrates skew mitigation by a skew manager in connection with a hash-hash join operation, such as the hash-hash join operation 1400 of FIG. 14.

The data processing system 1600 includes one or more worker nodes (or servers) (not illustrated in FIG. 16) executing join operations (or join processes) such as join process 1 (JP 1) 1606, JP 2 1608, . . . , JP N 1610. JP1 1606 includes an HJB instance 1630 managing build-side rows 1642, and an HJP instance 1632 managing a build table 1644 and a probe table 1646. JP 2 1608 includes an HJB instance 1634 managing build-side rows (not illustrated in FIG. 16), and an HJP instance 1636 managing a build table 1648 and a probe table 1650. JP N 1610 includes an HJB instance 1638 managing build-side rows (not illustrated in FIG. 16), and an HJP instance 1640 managing a build table 1652 and a probe table 1654.

The data processing system 1600 further includes server 1602 configured as the build-side hash link producer and server 1604 configured as the probe-side hash link producer. Server 1602 includes a skew manager 1612 (which can be the same as skew manager 128), a hash values generator 1622, and a hash value exception list 1624. The skew manager 1612 includes a skew detector 1614 and a skew handler 1618.

In operation, server 1602 uses hash values generator 1622 to generate one or more hash values used for hash partitioning build-side row data 1656 and generate partitioned build-side row data 1658. The skew detector 1614 comprises suitable circuitry, interfaces, and/or code and is configured to detect a frequent hash value 1616 and an associated build-side skew caused by partitioning build-side data 1656 using the frequent hash value. The skew handler 1618 comprises suitable circuitry, interfaces, and/or code and is configured to perform skew mitigation based on a skew detected by the skew detector 1614. For example, the skew handler 1618 can store the frequent hash value in a hash value exception list 1624, which list can be shared with other servers (e.g., hash link producers). For example, skew handler 1618 can share the hash value exception list 1624 with server 1604, which can store the list as a hash value exception list 1628.

In some embodiments, the skew handler 1618 can periodically check the skew associated with hash values in the list 1624 as well as any new hash values generated by the generator 1622, and update the list 1624 accordingly (e.g., delete a hash value that is no longer causing a skew or add a new hash value determined to cause skew).

In some embodiments, the skew handler also uses a distribution scheme to distribute the partitioned build-side row data 1658 to multiple HJB instances (e.g., HJB instances 1630, 1634, 1638) to prevent the build-side skew. In some embodiments, the distribution scheme 1620 is a round-robin scheme. In other aspects, the distribution scheme can be based on the size of build tables currently available at the corresponding HJB or HJP instances of JPs 1606, . . . , 1610.

Server 1604 is configured to generate hash values using the hash values generator 1626, which can be used for hash-partitioning of probe-side row data 1660 to generate partitioned probe-side row data 1662. The partitioned probe-side row data 1662 is communicated to corresponding HJP instances 1632, 1636, and 1640 for further processing.

In some aspects, the skew manager 1612 can be configured to perform the following two steps in terms of build-side skew handling: skew detection (e.g., by the skew detector 1614) and skew handling (e.g., by the skew handler 1618). Skew detection by the skew detector 1614 determines the most frequent build-side hash values (e.g., frequent hash value 1616). The skew handler 1618 redistributes partitioned build-side row data 1658 with the most popular (or frequent) hash value(s) among instances. In some aspects, the following two skew handling configurations can be used by the skew manager 1612:

(a) Partition and broadcast. The most frequent build-side rows are partitioned across instances. The probe-side counterparts are broadcasted to these instances.

(b) Broadcast and pass-through. The most frequent build-side rows are broadcasted to all instances. The probe-side counterparts are passed to local instances synchronously.

In some aspects, design considerations for the skew manager 1612 include where to conduct skew detection as well as how and when to start skew handling.

In some embodiments, the skew manager 1612 is configured to partition the most popular build-side rows (e.g., rows partitioned using the frequent hash value 1616) and broadcast the probe-side counterparts. More specifically, the skew manager 1612 partitions the most popular build-side rows (e.g., the partitioned build-side row data) that originally go to the overloaded HJB instance to multiple HJB instances. To ensure correctness, the probe-side rows with the same hash values are broadcasted to the corresponding HJP instances.

In some embodiments, the skew detector 1614 performs skew detection at the producer side of the hash link (e.g., at server 1602 which is the input link of HashJoinBuild instances). In some embodiments, the skew detector 1614 samples the first M build-side row sets, considers at the last N bits of build-side rows hash values and performs an estimation of the local/global skew associated with the corresponding hash value (M and N can be pre-configured parameters). An assumption can be made that there is one popular build key hash value (or a frequent hash value) in most cases. If a local instance finds a skewed value and other instances do not find other skewed values, then a determination is made that there is one common hash value, such as frequent hash value 1616. In some aspects, the skew handler 1618 (or the skew detector 1614) sends a notification message (e.g., out-of-band or OOB message) containing the skewed hash value (e.g., frequent hash value 1616) to all producers of the hash link in all nodes (e.g., to server 1604). In some aspects, detection of the frequent hash value at the receiver side of the hash link can be configured as well.

In some embodiments, the skew handler 1618 can perform the following functions. On receiving the OOB message, both the producer of the hash link (e.g., server 1602) and the producer of the probe-side link (e.g., server 1604) will add the contained frequent hash value to its hash value exception list (e.g., lists 1624 and 1628). Future build-side rows with this hash value can be partitioned according to distribution scheme 1620 (e.g., round robin) to multiple instances (e.g., instances with the smallest build partitions) instead of always going to the same HJB instance determined by the hash value. At this time, the probing process has not started yet. Probe-side rows (e.g., partitioned probe-side row data 1662) are sent after the broadcast vs hash-hash decision is made. If the join operation is a hash-hash join, probe-side rows with this hash value will be communicated to multiple HJP instances. For example, each probe side row that has a key in the exception list can be communicated to those instances that have received associated build-side rows.

In some aspects, the proposed techniques determine skewness at the producer side of the hash link (e.g., the input link of the HashJoinBuild). At this point, it is unknown whether the join operation will be a broadcast join or a hash-hash join. If the build-side skew is detected, the build-side will be redistributed before the broadcast decision is made. Since probing starts after the broadcast decision is made, the probe-side will not be redistributed in broadcast joins. In broadcast joins, a local instance i of HJB will send what it has to the instance i of HJP in all processes, which means global skew can never happen at HJP but there still exists the possibility of local skewness. Partitioning the most popular build-side rows can help mitigate the local skewness and achieve better probing load balance if the node does not merge its local hash tables (one per instance). Thus, broadcast joins also benefit from the disclosed build-side skew handling techniques.

In some embodiments, the disclosed skew manager can perform the following alternative skew detection techniques. In these approaches, skew detection can be conducted early (e.g., at the producer-side of the hash link). There are other alternative places to conduct skew detection including (a) at the HJB instance after it receives enough build-side row sets; (b) at HJB's termination when it has the global information; or (c) at HJP after it creates the hash tables.

In some embodiments, the skew manager can be configured to perform the following alternative skew handling techniques: no change to the build-side and redistribute probe-side rows whose hash values are popular.

In some embodiments, the skew manager can be configured to factor the global skewness into the broadcast decision and push the limit further for broadcast joins. More specifically, a pre-configured function (e.g., a hash function) calculates hash values and maintains the most frequent build key values. In a different processing function, if the master finds a very extreme skew and the probe side cardinality estimation is large enough, a broadcast join is used instead of a hash-hash join.

In some embodiments, the skew manager is configured to extend the probe-side skew handling mechanism to handle build-side skew. More specifically, the skew manager can extend the probe-side skew handling mechanism to handle cases where probe-side rows hit many build-side rows. In skew detection, probe-side skew handling detects probe-side skew based on the frequency of probe-side rows. The alternative approach can take the number of hit build-side rows for each probe-side row into account when deciding whether there is a skew.

In some aspects, skew handling is configured to broadcast the most popular build-side rows to all other instances. On receiving these most frequent hash values, an instance would add these to its hash value exception list. Therefore, future probe rows with these hash values that hit the skewed build-side rows will be passed through locally and probed against the local hash table.

FIG. 17 is a flow diagram illustrating the operations of a database system in performing method 1700 for detecting a frequent hash value, in accordance with some embodiments of the present disclosure. Method 1700 may be embodied in computer-readable instructions for execution by one or more hardware components (e.g., one or more processors) such that the operations of method 1700 may be performed by components of network-based database system 102, such as components of the execution platform 110 (e.g., the skew manager 128 or skew manager 1612) and/or the compute service manager 108 (which components may be implemented as machine 1900 of FIG. 19). Accordingly, method 1700 is described below, by way of example with reference thereto. However, it shall be appreciated that method 1700 may be deployed on various other hardware configurations and is not intended to be limited to deployment within the network-based database system 102.

At operation 1702, the skew detector 1614 samples a subset of a plurality of hash values (e.g., hash values generated by the hash values generator 1622). At operation 1704, a sample partitioned row set is determined using each hash value of the subset, to generate a plurality of sampled partitioned row sets. At operation 1706, size for each sampled partitioned row set of the plurality of sampled partitioned row sets is determined. At operation 1708, the skew detector 1614 detects a skew in a selected partitioned row set of the plurality of sampled partitioned row sets. For example, a skew can be detected when the size of the selected partitioned row set is greater than a threshold row set size. At operation 1710, the hash value corresponding to the selected partitioned row set is selected as the frequent hash value (e.g., frequent hash value 1616).

FIG. 18 is a flow diagram illustrating the operations of a database system in performing method 1800 for build-side skew handling, in accordance with some embodiments of the present disclosure. Method 1800 may be embodied in computer-readable instructions for execution by one or more hardware components (e.g., one or more processors) such that the operations of method 1800 may be performed by components of network-based database system 102, such as components of the compute service manager 108 (e.g., the skew manager 128 or skew manager 1612) and/or the execution platform 110 (which components may be implemented as machine 1900 of FIG. 19). Accordingly, method 1800 is described below, by way of example with reference thereto. However, it shall be appreciated that method 1800 may be deployed on various other hardware configurations and is not intended to be limited to deployment within the network-based database system 102.

At operation 1802, a plurality of hash values is determined for a join operation using a corresponding plurality of row sets. For example, the skew detector 1614 of the skew manager 1612 uses the hash values generator 1622 to determine hash values to be used for a join operation based on build-side row data 1656.

At operation 1804, the plurality of hash values are sampled to detect a frequent hash value. For example, the skew detector 1614 performs the functionalities described in connection with FIG. 17 to determine the frequent hash value 1616.

At operation 1806, a build-side row set (e.g., build-side row data 1656) is partitioned using the frequent hash value (e.g., frequent hash value 1616) to generate a partitioned build-side row set (e.g., partitioned build-side row data 1658). The build-side row set is selected from the plurality of row sets.

At operation 1808, the partitioned build-side row set is distributed to a plurality of hash-join-build (HJB) instances executing at a corresponding plurality of servers. For example, the partitioned build-side row data 1658 is distributed to HJB instances 1630, 1634, and 1638 (e.g., according to distribution scheme 1620). In this regard, each of the HJB instances can receive a portion of the partitioned build-side data to prevent the build-side skew.

Figure 19:
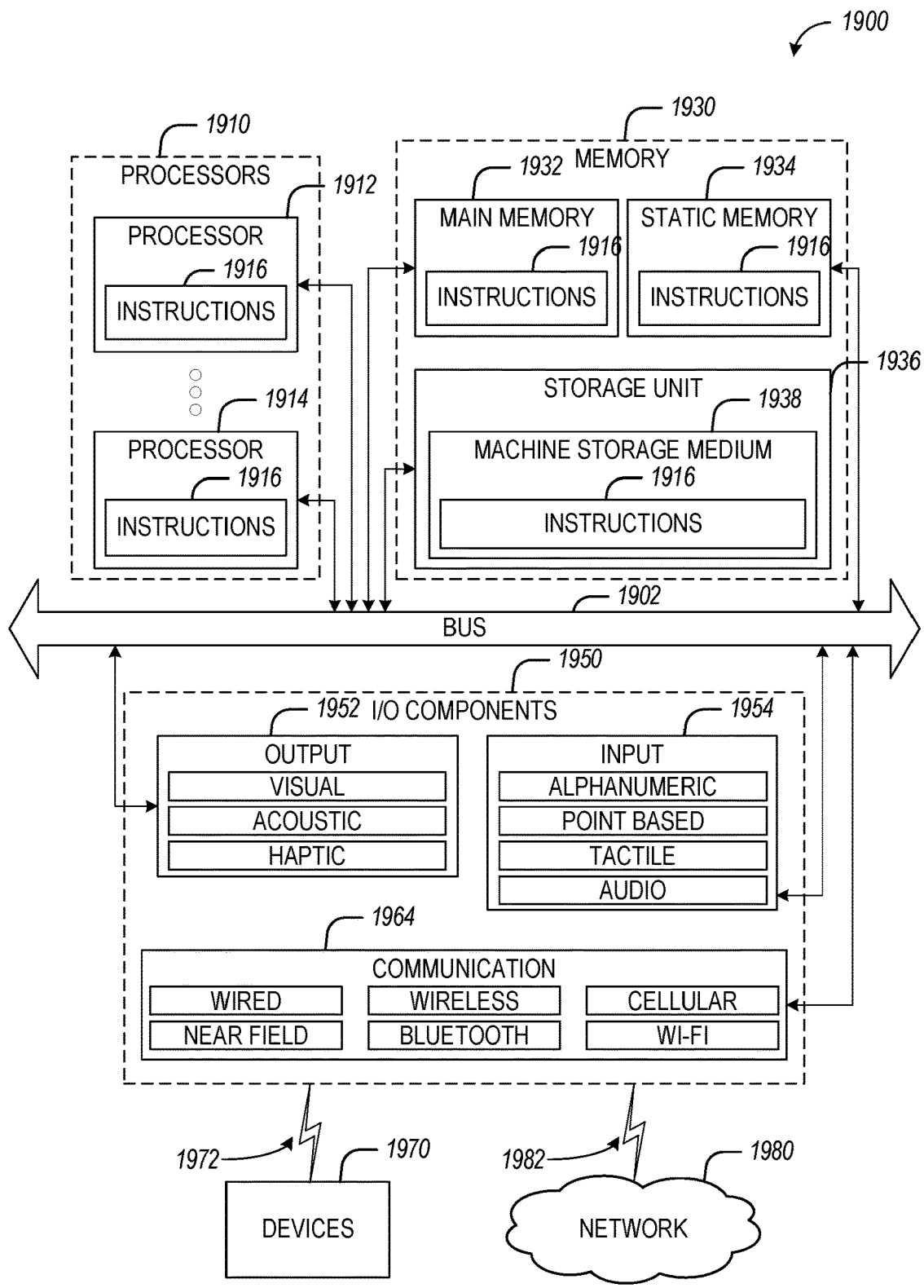
FIG. 19 illustrates a diagrammatic representation of a machine in the form of a computer system within which a set of instructions may be executed for causing the machine to perform any one or more of the methodologies discussed herein, in accordance with some embodiments of the present disclosure.

FIG. 19 illustrates a diagrammatic representation of a machine 1900 in the form of a computer system within which a set of instructions may be executed for causing the machine 1900 to perform any one or more of the methodologies discussed herein, according to an example embodiment. Specifically, FIG. 19 shows a diagrammatic representation of the machine 1900 in the example form of a computer system, within which instructions 1916 (e.g., software, a program, an application, an applet, an app, or other executable code) for causing the machine 1900 to perform any one or more of the methodologies discussed herein may be executed. For example, instructions 1916 may cause machine 1900 to execute any one or more operations of methods 1700 and 1800 (or any other technique discussed herein, for example in connection with FIG. 4-FIG. 18). As another example, instructions 1916 may cause machine 1900 to implement one or more portions of the functionalities discussed herein. In this way, instructions 1916 may transform a general, non-programmed machine into a particular machine 1900 (e.g., the compute service manager 108 or a node in the execution platform 110) that is specially configured to carry out any one of the described and illustrated functions in the manner described herein. In yet another embodiment, instructions 1916 may configure the compute service manager 108 and/or a node in the execution platform 110 to carry out any one of the described and illustrated functions in the manner described herein.

In alternative embodiments, the machine 1900 operates as a standalone device or may be coupled (e.g., networked) to other machines. In a networked deployment, machine 1900 may operate in the capacity of a server machine or a client machine in a server-client network environment, or as a peer machine in a peer-to-peer (or distributed) network environment. The machine 1900 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 1916, sequentially or otherwise, that specify actions to be taken by the machine 1900. Further, while only a single machine 1900 is illustrated, the term "machine" shall also be taken to include a collection of machines 1900 that individually or jointly execute the instructions 1916 to perform any one or more of the methodologies discussed herein.

Machine 1900 includes processors 1910, memory 1930, and input/output (I/O) components 1950 configured to communicate with each other such as via a bus 1902. In some example embodiments, the processors 1910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1912 and a processor 1914 that may execute the instructions 1916. The term "processor" is intended to include multi-core processors 1910 that may comprise two or more independent processors (sometimes referred to as "cores") that may execute instructions 1916 contemporaneously. Although FIG. 19 shows multiple processors 1910, the machine 1900 may include a single processor with a single core, a single processor with multiple cores (e.g., a multi-core processor), multiple processors with a single core, multiple processors with multiple cores, or any combination thereof.

The memory 1930 may include a main memory 1932, a static memory 1934, and a storage unit 1936, all accessible to the processors 1910 such as via the bus 1902. The main memory 1932, the static memory 1934, and the storage unit 1936 store the instructions 1916 embodying any one or more of the methodologies or functions described herein. The instructions 1916 may also reside, completely or partially, within the main memory 1932, within the static memory 1934, within machine storage medium 1938 of the storage unit 1936, within at least one of the processors 1910 (e.g., within the processor's cache memory), or any suitable combination thereof, during execution thereof by the machine 1900.

The I/O components 1950 include components to receive input, provide output, produce output, transmit information, exchange information, capture measurements, and so on. The specific I/O components 1950 that are included in a particular machine 1900 will depend on the type of machine. For example, portable machines such as mobile phones will likely include a touch input device or other such input mechanisms, while a headless server machine will likely not include such a touch input device. It will be appreciated that the I/O components 1950 may include many other components that are not shown in FIG. 19. The I/O components 1950 are grouped according to functionality merely for simplifying the following discussion and the grouping is in no way limiting. In various example embodiments, the I/O components 1950 may include output components 1952 and input components 1954. The output components 1952 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 1954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 1950 may include communication components 1964 operable to couple the machine 1900 to a network 1980 or devices 1970 via a coupling 1982 and a coupling 1972, respectively. For example, the communication components 1964 may include a network interface component or another suitable device to interface with the network 1980. In further examples, communication components 1964 may include wired communication components, wireless communication components, cellular communication components, and other communication components to provide communication via other modalities. The device 1970 may be another machine or any of a wide variety of peripheral devices (e.g., a peripheral device coupled via a universal serial bus (USB)). For example, as noted above, machine 1900 may correspond to any one of the compute service manager 108 or the execution platform 110, and device 1970 may include the client device 114 or any other computing device described herein as being in communication with the network-based database system 102 or the cloud storage platform 104.

The various memories (e.g., 1930, 1932, 1934, and/or memory of the processor(s) 1910 and/or the storage unit 1936) may store one or more sets of instructions 1916 and data structures (e.g., software) embodying or utilized by any one or more of the methodologies or functions described herein. These instructions 1916, when executed by the processor(s) 1910, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 1980 or a portion of network 1980 may include a wireless or cellular network, and the coupling 1982 may be a Code Division Multiple Access (CDMA) connection, a Global System for Mobile communications (GSM) connection, or another type of cellular or wireless coupling. In this example, the coupling 1982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1916 may be transmitted or received over network 1980 using a transmission medium via a network interface device (e.g., a network interface component included in the communication components 1964) and utilizing any one of several well-known transfer protocols (e.g., hypertext transfer protocol (HTTP)). Similarly, instructions 1916 may be transmitted or received using a transmission medium via coupling 1972 (e.g., a peer-to-peer coupling) to device 1970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1916 for execution by the machine 1900, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: computing a plurality of hash values for a join operation using a corresponding plurality of row sets; sampling the plurality of hash values to detect a frequent hash value; partitioning a build-side row set using the frequent hash value to generate a partitioned build-side row set, the build-side row set selected from the plurality of row sets; and distributing the partitioned build-side row set to a plurality of hash-join-build (HJB) instances executing at a corresponding plurality of servers.

In Example 2, the subject matter of Example 1 includes functionalities such as determining a size of a build partition available at each of the plurality of HJB instances.

In Example 3, the subject matter of Example 2 includes functionalities such as distributing the partitioned build-side row set to the plurality of HJB instances according to the determined size of the build partition available at each of the plurality of HJB instances.

In Example 4, the subject matter of Examples 1-3 includes functionalities such as distributing the partitioned build-side row set to the plurality of HJB instances according to a round-robin scheme.

In Example 5, the subject matter of Examples 1~4 includes functionalities such as sampling a subset of the plurality of hash values; determining a sample partitioned row set using each hash value of the subset, to generate a plurality of sampled partitioned row sets; and determining a size for each sampled partitioned row set of the plurality of sampled partitioned row sets.

In Example 6, the subject matter of Example 5 includes functionalities such as detecting skew in a selected partitioned row set of the plurality of sampled partitioned row sets, when the size of the selected partitioned row set is greater than a threshold row set size; and selecting the hash value corresponding to the selected partitioned row set as the frequent hash value.

In Example 7, the subject matter of Examples 1-6 includes functionalities such as encoding the frequent hash value for transmission to at least one hash link producer, the at least one hash link producer coupled to a plurality of hash-join-probe (HJP) instances executing at the corresponding plurality of servers.

In Example 8, the subject matter of Example 7 includes functionalities such as causing partitioning of a probe-side row set by the at least one hash link producer based on the transmission of the frequent hash value, to generate a partitioned probe-side row set, the partitioning of the probe-side row set using the frequent hash value.

In Example 9, the subject matter of Example 8 includes functionalities such as causing distributing the partitioned probe-side row set to the plurality of HJP instances executing at the corresponding plurality of servers.

In Example 10, the subject matter of Examples 1-9 includes functionalities such as determining a set of frequent hash values based on a plurality of frequent hash values received from a hash link producer configured at one or more of the plurality of servers; and selecting the frequent hash value from the plurality of frequent hash values, the frequent hash value being common between the plurality of hash values and the plurality of frequent hash values.

Example 11 is a method comprising: computing, by at least one hardware processor, a plurality of hash values for a join operation, the join operation using a corresponding plurality of row sets; sampling the plurality of hash values to detect a frequent hash value; partitioning a build-side row set using the frequent hash value to generate a partitioned build-side row set, the build-side row set selected from the plurality of row sets; and distributing the partitioned build-side row set to a plurality of hash-join-build (HJB) instances executing at a corresponding plurality of servers.

In Example 12, the subject matter of Example 11 includes, determining a size of a build partition available at each of the plurality of HJB instances.

In Example 13, the subject matter of Example 12 includes, distributing the partitioned build-side row set to the plurality of HJB instances according to the determined size of the build partition available at each of the plurality of HJB instances.

In Example 14, the subject matter of Examples 11-13 includes, distributing the partitioned build-side row set to the plurality of HJB instances according to a round-robin scheme.

In Example 15, the subject matter of Examples 11-14 includes, sampling a subset of the plurality of hash values; determining a sample partitioned row set using each hash value of the subset, to generate a plurality of sampled partitioned row sets; and determining a size for each sampled partitioned row set of the plurality of sampled partitioned row sets.

In Example 16, the subject matter of Example 15 includes, detecting a skew in a selected partitioned row set of the plurality of sampled partitioned row sets, when the size of the selected partitioned row set is greater than a threshold row set size; and selecting the hash value corresponding to the selected partitioned row set as the frequent hash value.

In Example 17, the subject matter of Examples 11-16 includes, encoding the frequent hash value for transmission to at least one hash link producer, the at least one hash link producer coupled to a plurality of hash-join-probe (HJP) instances executing at the corresponding plurality of servers.

In Example 18, the subject matter of Example 17 includes, causing partitioning of a probe-side row set by the at least one hash link producer based on the transmission of the frequent hash value, to generate a partitioned probe-side row set, the partitioning of the probe-side row set using the frequent hash value.

In Example 19, the subject matter of Example 18 includes, causing distributing the partitioned probe-side row set to the plurality of HJP instances executing at the corresponding plurality of servers.

In Example 20, the subject matter of Examples 11-19 includes, determining a set of frequent hash values based on a plurality of frequent hash values received from a hash link producer configured at one or more of the plurality of servers; and selecting the frequent hash value from the plurality of frequent hash values, the frequent hash value being common between the plurality of hash values and the plurality of frequent hash values.

Example 21 is a computer-storage medium comprising instructions that, when executed by one or more processors of a machine, configure the machine to perform operations comprising: computing at least one hardware processor, a plurality of hash values for a join operation, the join operation using a corresponding plurality of row sets; sampling the plurality of hash values to detect a frequent hash value; partitioning a build-side row set using the frequent hash value to generate a partitioned build-side row set, the build-side row set selected from the plurality of row sets; and distributing the partitioned build-side row set to a plurality of hash-join-build (HJB) instances executing at a corresponding plurality of servers.

In Example 22, the subject matter of Example 21 includes functionalities such as determining a size of a build partition available at each of the plurality of HJB instances.

In Example 23, the subject matter of Example 22 includes functionalities such as distributing the partitioned build-side row set to the plurality of HJB instances according to the determined size of the build partition available at each of the plurality of HJB instances.

In Example 24, the subject matter of Examples 21-23 includes functionalities such as distributing the partitioned build-side row set to the plurality of HJB instances according to a round-robin scheme.

In Example 25, the subject matter of Examples 21-24 includes functionalities such as sampling a subset of the plurality of hash values; determining a sample partitioned row set using each hash value of the subset, to generate a plurality of sampled partitioned row sets; and determining a size for each sampled partitioned row set of the plurality of sampled partitioned row sets.

In Example 26, the subject matter of Example 25 includes functionalities such as detecting a skew in a selected partitioned row set of the plurality of sampled partitioned row sets, when the size of the selected partitioned row set is greater than a threshold row set size; and selecting the hash value corresponding to the selected partitioned row set as the frequent hash value.

In Example 27, the subject matter of Examples 21-26 includes functionalities such as encoding the frequent hash value for transmission to at least one hash link producer, the at least one hash link producer coupled to a plurality of hash-join-probe (HJP) instances executing at the corresponding plurality of servers.

In Example 28, the subject matter of Example 27 includes functionalities such as causing partitioning of a probe-side row set by the at least one hash link producer based on the transmission of the frequent hash value, to generate a partitioned probe-side row set, the partitioning of the probe-side row set using the frequent hash value.

In Example 29, the subject matter of Example 28 includes functionalities such as causing distributing the partitioned probe-side row set to the plurality of HJP instances executing at the corresponding plurality of servers.

In Example 30, the subject matter of Examples 21-29 includes functionalities such as determining a set of frequent hash values based on a plurality of frequent hash values received from a hash link producer configured at one or more of the plurality of servers; and selecting the frequent hash value from the plurality of frequent hash values, the frequent hash value being common between the plurality of hash values and the plurality of frequent hash values.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any Examples 1-30.

Example 34 is a method to implement any Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
at least one hardware processor of a first server; and
at least one memory storing instructions that cause the at least one hardware processor to perform operations comprising:
generating at the first server, a plurality of build-side row sets using build-side row data received from a second server;
computing, at the first server, a plurality of hash values for a join operation using the build-side row data, the join operation using the plurality of build-side row sets as build-side input and a plurality of probe-side row sets of probe-side row data originating from a third server as probe-side input, data from the probe-side input being probed to detect a match with data from build-side input during the join operation;

sampling the plurality of hash values associated with the plurality of build-side row sets to detect a frequent hash value, the frequent hash value appearing at least a threshold number of times in the plurality of hash values for the build-side row data;

partitioning a build-side row set of the plurality of build-side row sets to generate a partitioned build-side row set, the build-side row set using the frequent hash value, and the partitioned build-side row set including a plurality of hash partitions of the build-side row data, a number of rows in the build-side row data being smaller than a number of rows in the probe-side row data after the partitioning of the build-side row set;

distributing the plurality of hash partitions to a plurality of hash-join-build (HJB) instances executing at a corresponding plurality of additional servers, each server of the plurality of additional servers executing one of the plurality of HJB instances using a hash partition of the plurality of hash partitions; and outputting a result of the join operation based on completion of execution of the plurality of HJB instances at the plurality of additional servers.

2. The system of claim 1, the operations comprising:
determining a size of a build partition available at each of the plurality of HJB instances.

3. The system of claim 2, the operations comprising:
distributing the plurality of hash partitions to the plurality of HJB instances according to the determined size of the build partition available at each of the plurality of HJB instances.

4. The system of claim 1, the operations comprising:
distributing the plurality of hash partitions to the plurality of HJB instances according to a round-robin scheme.

5. The system of claim 1, the operations comprising:
sampling a subset of the plurality of hash values;
determining a sample partitioned row set using each hash value of the subset, to generate a plurality of sampled partitioned row sets; and
determining a size for each sampled partitioned row set of the plurality of sampled partitioned row sets.

6. The system of claim 5, the operations comprising:
detecting a skew in a selected partitioned row set of the plurality of sampled partitioned row sets, when the size of the selected partitioned row set is greater than a threshold row set size; and
selecting the hash value corresponding to the selected partitioned row set as the frequent hash value.

7. The system of claim 1, the operations comprising:
encoding the frequent hash value for transmission to a third server, the third server configured as at least one hash link producer, the at least one hash link producer coupled to a plurality of hash-join-probe (HJP) instances executing at the plurality of additional servers.

8. The system of claim 7, the operations comprising:
causing partitioning of a probe-side row set by the at least one hash link producer based on the transmission of the frequent hash value, to generate a partitioned probe-side row set, the partitioning of the probe-side row set using the frequent hash value.

9. The system of claim 8, the operations comprising:
causing distributing the partitioned probe-side row set to the plurality of HJP instances executing at the plurality of additional servers.

10. The system of claim 1, the operations comprising:
determining a set of frequent hash values based on a plurality of frequent hash values received from a hash link producer configured at one or more of the plurality of additional servers;
and selecting the frequent hash value from the plurality of frequent hash values, the frequent hash value being common between the plurality of hash values and the plurality of frequent hash values.

11. A method comprising:
generating, by at least one hardware processor of a first server, a plurality of build-side row sets using build-side row data received from a second server;
computing, by the at least one hardware processor, a plurality of hash values for a join operation using the build-side row data, the join operation using the plurality of build-side row sets as build-side input and a plurality of probe-side row sets of probe-side row data originating from a third server as probe-side input, data from the probe-side input being probed to detect a match with data from build-side input during the join operation;
sampling the plurality of hash values associated with the plurality of build-side row sets to detect a frequent hash value, the frequent hash value appearing at least a threshold number of times in the plurality of hash values for the build-side row data;
partitioning a build-side row set of the plurality of build-side row sets to generate a partitioned build-side row set, the build-side row set using the frequent hash value, and the partitioned build-side row set including a plurality of hash partitions of the build-side row data, a number of rows in the build-side row data being smaller than a number of rows in the probe-side row data after the partitioning of the build-side row set;
distributing the plurality of hash partitions to a plurality of hash-join-build (HJB) instances executing at a corresponding plurality of additional servers, each server of the plurality of additional servers executing one of the plurality of HJB instances using a hash partition of the plurality of hash partitions; and
outputting a result of the join operation based on completion of execution of the plurality of HJB instances at the plurality of additional servers.

12. The method of claim 11, further comprising:
determining a size of a build partition available at each of the plurality of HJB instances.

13. The method of claim 12, further comprising:
distributing the plurality of hash partitions to the plurality of HJB instances according to the determined size of the build partition available at each of the plurality of HJB instances.

14. The method of claim 11, further comprising:
distributing the plurality of hash partitions to the plurality of HJB instances according to a round-robin scheme.

15. The method of claim 11, further comprising:
sampling a subset of the plurality of hash values;
determining a sample partitioned row set using each hash value of the subset, to generate a plurality of sampled partitioned row sets; and
determining a size for each sampled partitioned row set of the plurality of sampled partitioned row sets.

16. The method of claim 15, further comprising:
detecting a skew in a selected partitioned row set of the plurality of sampled partitioned row sets, when the size of the selected partitioned row set is greater than a threshold row set size; and selecting the hash value corresponding to the selected partitioned row set as the frequent hash value.

17. The method of claim 11, further comprising:
encoding the frequent hash value for transmission to a third server, the third server configured as at least one hash link producer, the at least one hash link producer coupled to a plurality of hash-join-probe (HJP) instances executing at the plurality of additional servers.

18. The method of claim 17, further comprising:
causing partitioning of a probe-side row set by the at least one hash link producer based on the transmission of the frequent hash value, to generate a partitioned probe-side row set, the partitioning of the probe-side row set using the frequent hash value.

19. The method of claim 18, further comprising:
causing distributing the partitioned probe-side row set to the plurality of HJP instances executing at the plurality of additional servers.

20. The method of claim 11, further comprising:
determining a set of frequent hash values based on a plurality of frequent hash values received from a hash link producer configured at one or more of the plurality of additional servers;
and selecting the frequent hash value from the plurality of frequent hash values, the frequent hash value being common between the plurality of hash values and the plurality of frequent hash values.

21. A computer-storage medium comprising instructions that, when executed by one or more processors of a machine, configure the machine to perform operations comprising:
generating, by at least one hardware processor of a first server, a plurality of build-side row sets using build-side row data received from a second server;
computing, by the at least one hardware processor, a plurality of hash values for a join operation using the build-side row data, the join operation using the plurality of build-side row sets as build-side input and a plurality of probe-side row sets of probe-side row data originating from a third server as probe-side input, data from the probe-side input being probed to detect a match with data from build-side input during the join operation;
sampling the plurality of hash values associated with the plurality of build-side row sets to detect a frequent hash value, the frequent hash value appearing at least a threshold number of times in the plurality of hash values for the build-side row data;
partitioning a build-side row set of the plurality of build-side row sets to generate a partitioned build-side row set, the build-side row set using the frequent hash value, and the partitioned build-side row set including a plurality of hash partitions of the build-side row data, a number of rows in the build-side row data being smaller than a number of rows in the probe-side row data after the partitioning of the build-side row set;
distributing the plurality of hash partitions to a plurality of hash-join-build (HJB) instances executing at a corresponding plurality of additional servers, each server of the plurality of additional servers executing one of the plurality of HJB instances using a hash partition of the plurality of hash partitions; and
outputting a result of the join operation based on completion of execution of the plurality of HJB instances at the plurality of additional servers.

22. The computer-storage medium of claim 21, the operations comprising:
determining a size of a build partition available at each of the plurality of HJB instances.

23. The computer-storage medium of claim 22, the operations comprising:
distributing the plurality of hash partitions to the plurality of HJB instances according to the determined size of the build partition available at each of the plurality of HJB instances.

24. The computer-storage medium of claim 21, the operations comprising:
distributing the plurality of hash partitions to the plurality of HJB instances according to a round-robin scheme.

25. The computer-storage medium of claim 21, the operations comprising:
sampling a subset of the plurality of hash values;
determining a sample partitioned row set using each hash value of the subset, to generate a plurality of sampled partitioned row sets; and
determining a size for each sampled partitioned row set of the plurality of sampled partitioned row sets.

26. The computer-storage medium of claim 25, the operations comprising:
detecting a skew in a selected partitioned row set of the plurality of sampled partitioned row sets, when the size of the selected partitioned row set is greater than a threshold row set size; and
selecting the hash value corresponding to the selected partitioned row set as the frequent hash value.

27. The computer-storage medium of claim 21, the operations comprising:
encoding the frequent hash value for transmission to a third server, the third server configured as at least one hash link producer, the at least one hash link producer coupled to a plurality of hash-join-probe (HJP) instances executing at the plurality of additional servers.

28. The computer-storage medium of claim 27, the operations comprising:
causing partitioning of a probe-side row set by the at least one hash link producer based on the transmission of the frequent hash value, to generate a partitioned probe-side row set, the partitioning of the probe-side row set using the frequent hash value.

29. The computer-storage medium of claim 28, the operations comprising:
causing distributing the partitioned probe-side row set to the plurality of HJP instances executing at the plurality of additional servers.

30. The computer-storage medium of claim 21, the operations comprising:
determining a set of frequent hash values based on a plurality of frequent hash values received from a hash link producer configured at one or more of the plurality of additional servers; and selecting the frequent hash value from the plurality of frequent hash values, the frequent hash value being common between the plurality of hash values and the plurality of frequent hash values.

* * * * *

UNITED STATES PATENT AND TRADEMARK OFFICE
CERTIFICATE OF CORRECTION

PATENT NO. : 12,001,428 B2
APPLICATION NO. : 18/047872
DATED : June 4, 2024
INVENTOR(S) : Cai et al.

Page 1 of 1

It is certified that error appears in the above-identified patent and that said Letters Patent is hereby corrected as shown below:

In the Claims

In Column 32, Line 5, in Claim 10, after "servers;", insert --and--

In Column 32, Line 6, in Claim 10, delete "and selecting" and insert --selecting-- therefor In Column 33, Line 25, in Claim 20, after "servers;", insert --and--

In Column 33, Line 26, in Claim 20, delete "and selecting" and insert --selecting-- therefor In Column 34, Line 58, in Claim 30, after "and", insert a linebreak Signed and Sealed this
Fifteenth Day of July, 2025

Coke Morgan Stewart
*Acting Director of the United States Patent and Trademark Office*